(12) United States Patent
Nishikawa et al.

(10) Patent No.: US 10,668,802 B2
(45) Date of Patent: Jun. 2, 2020

(54) HYBRID CONSTRUCTION MACHINE

(71) Applicant: Hitachi Construction Machinery Co., Ltd., Taito-ku, Tokyo (JP)

(72) Inventors: Shinji Nishikawa, Kasumigaura (JP); Shinya Imura, Toride (JP); Masafumi Hita, Kasumigaura (JP); Hiroaki Amano, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 184 days.

(21) Appl. No.: 15/755,983

(22) PCT Filed: Sep. 29, 2016

(86) PCT No.: PCT/JP2016/078950
§ 371 (c)(1),
(2) Date: Feb. 27, 2018

(87) PCT Pub. No.: WO2018/061166
PCT Pub. Date: Apr. 5, 2018

(65) Prior Publication Data
US 2019/0111773 A1   Apr. 18, 2019

(51) Int. Cl.
*B60K 6/485* (2007.10)
*B60W 10/30* (2006.01)
(Continued)

(52) U.S. Cl.
CPC .............. *B60K 6/485* (2013.01); *B60W 10/30* (2013.01); *B60W 20/13* (2016.01); *E02F 9/2075* (2013.01);
(Continued)

(58) Field of Classification Search
CPC ....... B60K 6/485; B60W 10/08; B60W 20/13; B60W 2300/17; B60Y 2200/92; E02F 9/2075; E02F 9/2091; E02F 9/2245
See application file for complete search history.

(56) References Cited

U.S. PATENT DOCUMENTS

2012/0245806 A1* 9/2012 Kawasaki ............. E02F 9/2075
701/50
2012/0296510 A1* 11/2012 Kawashima ............. E02F 9/22
701/22
(Continued)

FOREIGN PATENT DOCUMENTS

EP   2 851 475 A1   3/2015
JP   2004-11256 A   1/2004
(Continued)

OTHER PUBLICATIONS

International Preliminary Report on Patentability (PCT/IB/338 & PCT/IB/373) issued in PCT Application No. PCT/JP2016/078950 dated Apr. 11,2019, including English translation of document C2 (Japanese-language Written Opinion (PCT/ISA/237) previously filed on Feb. 27, 2018) (seven (7) pages).
(Continued)

*Primary Examiner* — Anshul Sood
(74) *Attorney, Agent, or Firm* — Crowell & Moring LLP

(57) ABSTRACT

It becomes possible to prevent deterioration of an electric storage device due to overdischarge of the electric storage device and engine stalling due to insufficient assist or disabled assist when a charge amount of the electric storage device falls, ensure that work is continuously conducted, suppress an operator from feeling discomfort in operation, and ensure favorable operability. A pump target output power computing section (21) computes present pump demanded power on the basis of work related information, limits the present pump demanded power in response to a (Continued)

degree of reduction of a state of charge of an electric storage device (12a) when the state of charge is lower than a preset threshold, and computes the limited present pump demanded power as present pump target output power. A pump flow rate limiting command value computing section (22) computes a pump flow rate limiting command value on the basis of the present pump target output power in such a manner that output power of a hydraulic pump (9) does not exceed the pump target output power.

6 Claims, 16 Drawing Sheets

(51) Int. Cl.

| | | |
|---|---|---|
| *B60W 20/13* | (2016.01) | |
| *E02F 9/20* | (2006.01) | |
| *F02D 29/06* | (2006.01) | |
| *F02D 29/02* | (2006.01) | |
| *E02F 9/22* | (2006.01) | |
| *B60W 10/06* | (2006.01) | |
| *F02D 29/00* | (2006.01) | |

(52) U.S. Cl.
CPC .......... *E02F 9/2091* (2013.01); *E02F 9/2235* (2013.01); *E02F 9/2246* (2013.01); *E02F 9/2285* (2013.01); *F02D 29/02* (2013.01); *F02D 29/06* (2013.01); *B60W 10/06* (2013.01); *B60W 2300/17* (2013.01); *B60Y 2200/92* (2013.01); *F02D 29/00* (2013.01); *Y02T 10/6226* (2013.01)

(56) References Cited

U.S. PATENT DOCUMENTS

| | | | |
|---|---|---|---|
| 2014/0186191 A1 | 7/2014 | Sasaki et al. | |
| 2015/0144408 A1* | 5/2015 | Ishihara | E02F 9/2075 180/53.4 |
| 2015/0337521 A1* | 11/2015 | Sakamoto | B60K 6/485 180/65.26 |
| 2016/0215480 A1 | 7/2016 | Ishihara et al. | |
| 2016/0257293 A1 | 9/2016 | Takahashi et al. | |

FOREIGN PATENT DOCUMENTS

| | | | |
|---|---|---|---|
| JP | 2007-151263 | A | 6/2007 |
| JP | 3941951 | B2 | 7/2007 |
| JP | 2012-158931 | A | 8/2012 |
| JP | 2015-86664 | A | 5/2015 |
| JP | 2016-160667 | A | 9/2016 |
| WO | WO 2013/172276 | A1 | 11/2013 |
| WO | WO 2016/060132 | A1 | 4/2016 |

OTHER PUBLICATIONS

Japanese-language International Search Report (PCT/ISA/210) issued in PCT Application No. PCT/JP2016/078950 dated Sep. 29, 2016 (Four (4) pages).
Japanese-language Written Opinion (PCT/ISA/237) issued in PCT Application No. PCT/JP2016/078950 dated Sep. 29, 2016 (Four (4) pages).
English translation of document C1 (Japanese-language Search Report (PCT/ISA/210) issued in PCT Application No. PCT/JP2016/078950 previously filed on Feb. 27, 2018 (two (2) ages.).

* cited by examiner

HYBRID CONSTRUCTION MACHINE

TECHNICAL FIELD

The present invention relates to a hybrid construction machine such as a hydraulic excavator equipped with an electric storage device and a generator motor.

BACKGROUND ART

There is known, as a type of a construction machine such as a hydraulic excavator, a hybrid construction machine configured such that an engine is miniaturized to reduce fuel consumption, a generator motor (an assist motor) is connected to the engine to make up a transitional or steady shortfall in output power, and an electric storage device is charged using the output power of the engine, while powering assist is given to drive a hydraulic pump using electric power of the electric storage device. Patent Document 1 describes one example of the hybrid construction machine.

Patent Document 1 proposes exercising control such that a powering assist amount is limited and pump absorption horsepower is limited to prevent the electric storage device from turning into an overdischarge state when an operating state is in a work mode and a remaining charge amount of the electric storage device falls. In other words, a total value of powering output power of a generator motor determined from preset discharge electric energy for a degree of reduction of a charge amount of the electric storage device and output power of an engine is set as an upper limiting value of the pump absorption horsepower, and output power control is exercised such that maximum output power (or torque) from a hydraulic pump is limited to prevent the maximum output power (or torque) from exceeding the value.

PRIOR ART DOCUMENT

Patent Document

Patent Document 1: Japanese Patent No. 3941951

SUMMARY OF THE INVENTION

Problem to be Solved by the Invention

Generally, no problem occurs to the hybrid construction machine when the remaining charge amount of the electric storage device is sufficient. However, a problem such as deterioration of the electric storage device due to excessive reduction of the remaining charge amount (overdischarge) and engine stalling due to insufficient assist or disabled assist occurs to the hybrid construction machine.

According to Patent Document 1, when the remaining charge amount of the electric storage device falls, output power control is exercised such that the powering assist amount is limited and the maximum output power torque of the hydraulic pump is limited as described above. Therefore, it is possible to prevent the deterioration of the electric storage device due to the overdischarge of the electric storage device and the engine stalling due to the disabled assist, and to continue vehicle body operation. However, Patent Document 1 has the following problem. Simply limiting the maximum output power of the hydraulic pump irrespective of a content of work makes it impossible to prevent the overdischarge of the electric storage device while maintaining operability in a series of continuous cycle work.

For example, when the hydraulic excavator loads gravel and soil into a dump truck, an operating cycle of excavation, swing/boom raising, discharge of gravel and sand, return to swing, excavation, . . . is repeated. When attention is paid to the excavation and the swing/boom raising, these operations are heavy load operations that require assist from the generator motor with electric power supplied from the electric storage device. Furthermore, the swing/boom raising is normally higher than the excavation in demanded pump output power.

In Patent Document 1, when the remaining charge amount falls, the upper limiting value of the pump output power is limited irrespectively of the content of work. Owing to this, when output power after limitation is compared with that before limitation, a limiting (reduction) amount of the output power for the swing/boom raising is larger than that for the excavation. In other words, a ratio of a speed reduction during limitation to that during non-limitation for the swing/boom raising is higher than that for the excavation. This difference in speed reduction ratio possibly causes an operator engaged in a series of work to feel discomfort in operation and thereby feel an unnecessary stress.

Moreover, types of work with the hydraulic excavator cannot be completely classified into the excavation, the swing/boom raising, and the like. Furthermore, necessary output power is variable even for each of the excavation and the swing/boom raising, so that simply limiting the upper limit of the output power of the hydraulic pump makes it difficult to prevent the overdischarge of the electric storage device while maintaining the operability.

An object of the present invention is to provide a hybrid construction machine that can prevent deterioration of an electric storage device due to overdischarge of the electric storage device and engine stalling due to insufficient assist or disabled assist to ensure continuous work when a charge amount of the electric storage device falls, while suppressing an operator from feeling discomfort in operation and ensuring favorable operability.

Means for Solving the Problem

To solve the problem, the present invention provides a hybrid construction machine, comprising: an engine; at least one generator motor; an electric storage device that is charged when the generator motor is caused to perform a power generation operation and that is discharged when the generator motor is caused to perform a powering operation; an electric storage control system that computes a state of charge of the electric storage device and monitors the electric storage device; a variable displacement hydraulic pump driven by torques of the engine and the generator motor; a plurality of hydraulic actuators driven by a hydraulic fluid delivered from the hydraulic pump; a plurality of operation devices that output operation signals in response to operation amounts for the plurality of hydraulic actuators and instruct the hydraulic actuators to operate; a controller that controls charge electric power and discharge electric power of the generator motor and a delivery flow rate and output power of the hydraulic pump; and a regulator that controls a displacement of the hydraulic pump to control the delivery flow rate of the hydraulic pump, wherein the controller includes a pump target output power computing section that computes present pump target output power of the hydraulic pump, and a pump flow rate limiting command value computing section that computes a pump flow rate limiting command value for controlling the delivery flow rate and the output power of the hydraulic pump, wherein the pump target output power computing section is configured to compute present pump demanded power of the hydraulic pump on the basis of work related information, limit the present pump demanded power in response to a degree of reduction of a state of charge of the electric storage device acquired from the electric storage control system when the state of charge of the electric storage device is lower than a preset threshold, and compute the limited present pump demanded power as the present pump target output power, and the pump flow rate limiting command value computing section is configured to compute the pump flow rate limiting command value on the basis of the present pump target output power in such a manner that the output power of the hydraulic pump does not exceed the pump target output power, and wherein the regulator controls the displacement of the hydraulic pump and controls the delivery flow rate of the hydraulic pump on the basis of the pump flow rate limiting command value.

In this way, when the state of charge of the electric storage device is lower than the threshold, then the present pump demanded power is limited in response to the degree of reduction of the state of charge of the electric storage device to compute the pump target output power, and the delivery flow rate of the hydraulic pump is controlled. It is therefore possible to prevent deterioration of the electric storage device due to overdischarge of the electric storage device and engine stalling due to insufficient assist or disabled assist thereby to continuously conduct work when the charge amount of the electric storage device falls.

Furthermore, the present pump demanded power is computed on the basis of work related information, the pump flow rate limiting command value is computed on the basis of the pump target output power that is the pump demanded power limited in response to the degree of reduction of the state of charge of the electric storage device in such a manner that the output power of the hydraulic pump does not exceed the pump target output power, and the delivery flow rate of the hydraulic pump is controlled. It is therefore possible to limit the output power of the hydraulic pump in response to the work related information and to reduce a speed while balance is kept as a whole in a series of continuous cycle work and minimize discomfort in operation when the speed falls, thereby to suppress an operator from feeling discomfort in operation and ensure favorable operability.

Effect of the Invention

According to the present invention, it is possible to prevent deterioration of an electric storage device due to overdischarge of the electric storage device and engine stalling due to insufficient assist or disabled assist when a charge amount of the electric storage device falls, ensure that work is continuously conducted, suppress an operator from feeling discomfort in operation, and ensure favorable operability.

MODES FOR CARRYING OUT THE INVENTION

Embodiments of the present invention will be described hereinafter with reference to the drawings.

First Embodiment

Explanation of Overall Excavator

Figure 1:
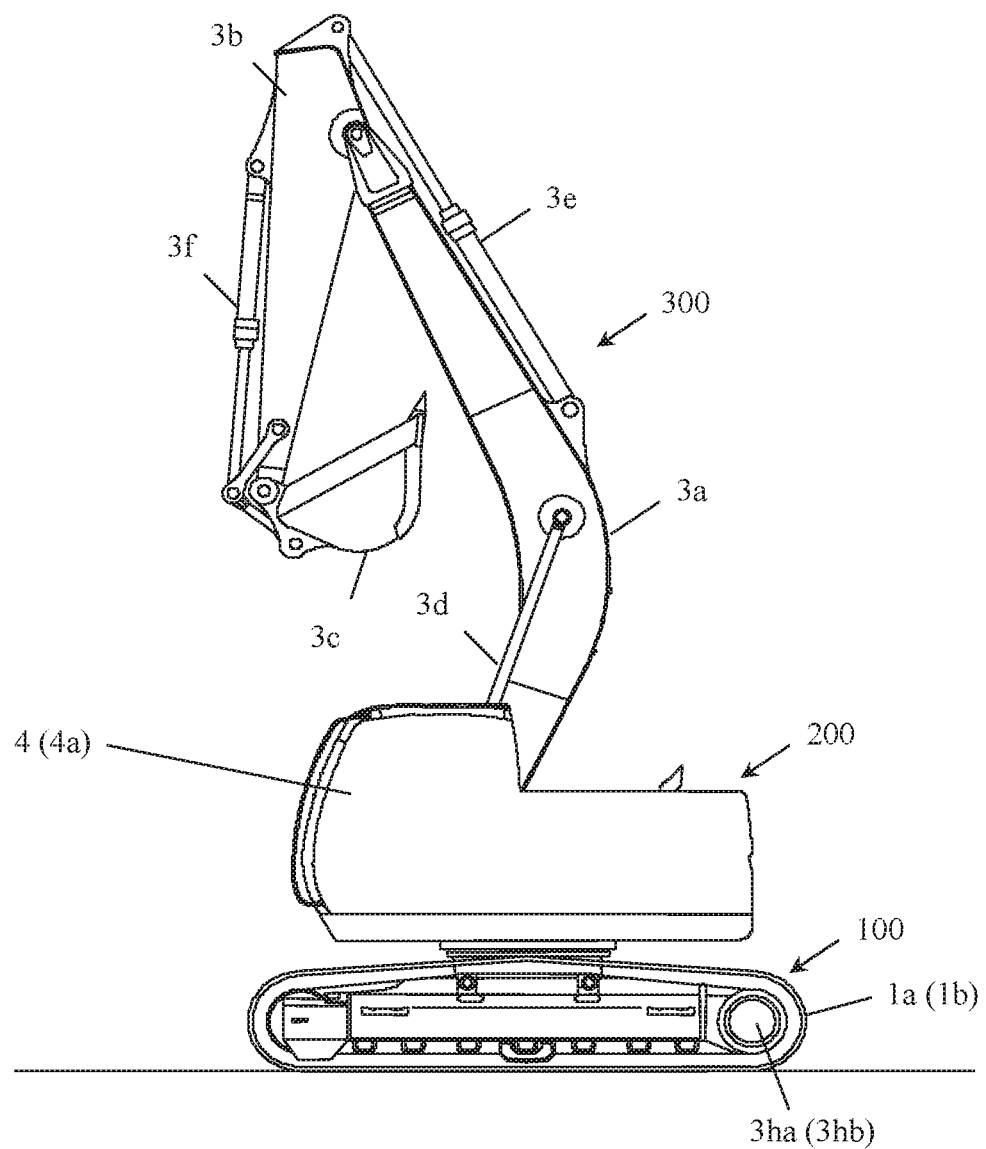
FIG. 1 shows an external view of a hybrid hydraulic excavator as one example of a construction machine according to a first embodiment of the present invention.

FIG. 1 shows an external view of a hybrid hydraulic excavator as one example of a construction machine according to the present embodiment.

In FIG. 1, the hybrid hydraulic excavator (construction machine) is generally configured with a crawler type lower travel structure 100, an upper swing structure 200 swingably provided on the lower travel structure 100, and a front work implement 300 equipped with excavation means and the like.

A pair of left and right travel hydraulic motors 3ha and 3hb are disposed in the lower travel structure 100. Crawler belts 1a and 1b are driven to rotate independently of each other by the travel hydraulic motors 3ha and 3hb, speed reduction mechanisms of the travel hydraulic motors 3ha and 3hb, and the like, and travel forward or rearward.

Figure 2:
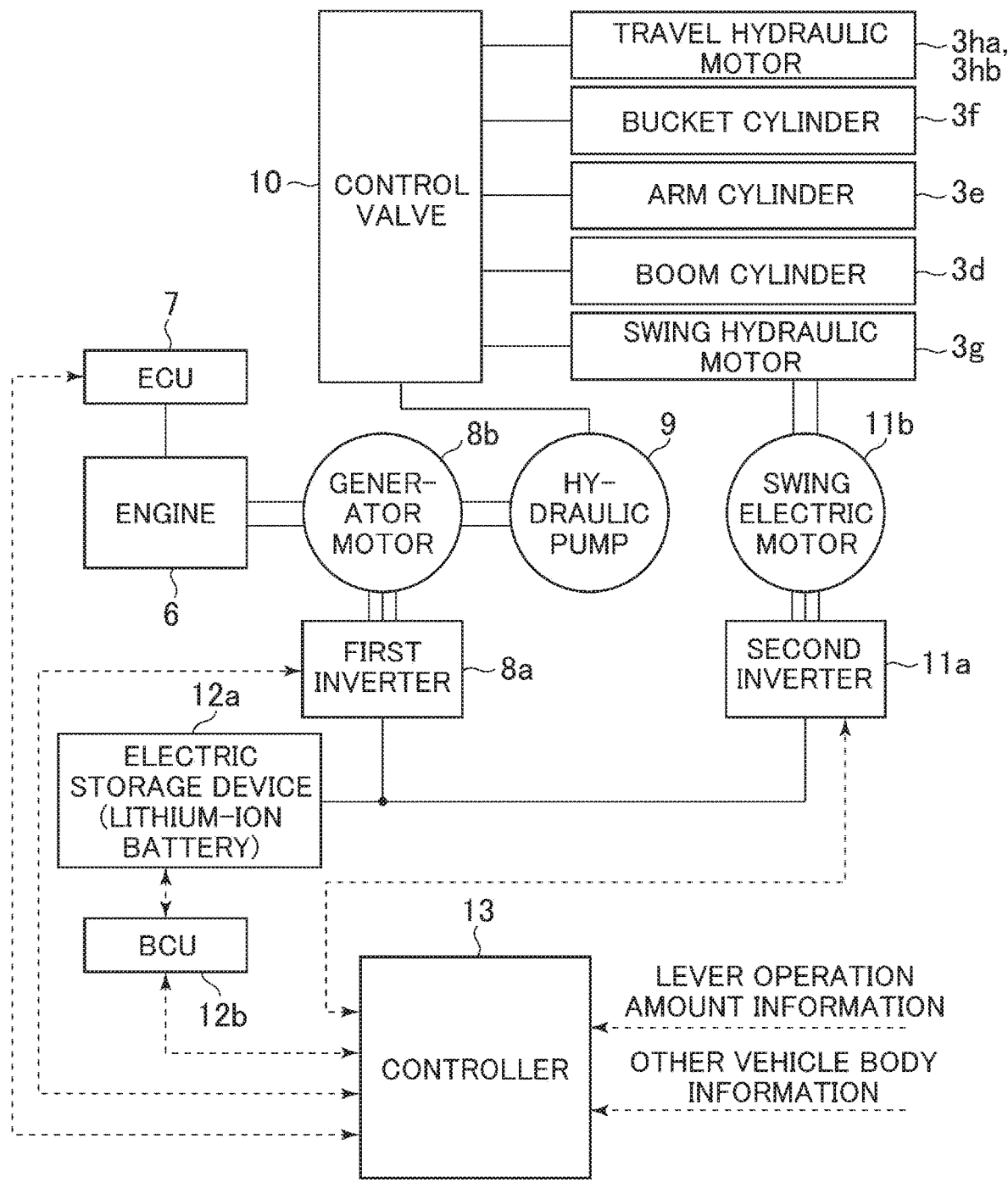
FIG. 2 shows a configuration of a hybrid system in the hybrid hydraulic excavator.

The upper swing structure 200 is provided with a cabin 4 that forms an operation room 4a in which a plurality of operation devices 15 (FIG. 3) performing various operations on the hydraulic excavator, a cab seat on which an operator is seated, and the like are disposed, prime movers such as an engine 6 and a generator motor 8b shown in FIG. 2, an electric storage device 12a, a hydraulic pump 9, a swing hydraulic motor 3g, a swing electric motor 11b, and the like. The upper swing structure 200 is driven to swing in a right direction or a left direction with respect to the lower travel structure 100 by the swing hydraulic motor 3g and the swing electric motor 11b. Various meters and gauges that enable the operator to confirm a status of the hydraulic excavator (construction machine) and a display device 5 (FIG. 3) that displays machine information are provided in the operation room 4a within the cabin 4.

The front work implement 300 is configured with a boom 3a, an arm 3b, and a bucket 3c. The boom 3a is vertically moved by a boom cylinder 3d, the arm 3b is operated to a dumping side (open side) or a crowding side (shoveling side) by an arm cylinder 3e, and the bucket 3c is operated to the dumping side or the crowding side by a bucket cylinder 3f. The bucket 3c configures excavating means.

Explanation of Hybrid System

FIG. 2 shows a configuration of a hybrid system in the hybrid hydraulic excavator.

In FIG. 2, the hybrid system has the engine 6, an engine control unit (ECU) 7 that controls the engine 6, the generator motor 8b and the hydraulic pump 9 coupled to the engine 6, a control valve 10, the swing electric motor 11b, the electric storage device 12a, a first inverter 8a, a second inverter 11a, a battery control unit (BCU) 12b, and a machine controller (hereinafter may be simply referred to as controller) 13.

The control valve 10 opens or closes a hydraulic path corresponding to each of the boom cylinder 3d, the arm cylinder 3e, the bucket cylinder 3f, the swing hydraulic motor 3g, and the travel hydraulic motors 3ha and 3hb in response to an operation on an operation lever 15a of each of the plurality of operation devices 15 installed in the operation room 4a. The electric storage device 12a is assumed as a lithium-ion battery at a voltage of 350 V, a discharge capacity of about 5 Ah, and a charge rate proper use range of 30% to 70%, and is controlled by the battery control unit (BCU) 12b.

The battery control unit (BCU) 12b computes a state of charge (SOC) of the electric storage device 12a and manages a state of the electric storage device 12a by transmission and reception of signals to and from the electric storage device 12a. In addition, the battery control unit 12b outputs information about the state of charge to the controller 13 on the basis of a control signal from the controller 13. This state of charge will be referred hereinafter as charge rate.

Furthermore, the lithium-ion battery 12a is connected to the first inverter 8a and the second inverter 11a by a direct-current bus.

The first inverter 8a exercises control over input/output waveforms of the generator motor 8b that is a three-phase alternating current motor by conversion between a direct current and an alternating current, and the generator motor 8b performs a powering operation for assisting the engine 6 and a power generation operation by power of the engine 6.

Likewise, the second inverter 11a exercises control over input/output waveforms of the swing electric motor 11b that is a three-phase alternating current motor, and the swing electric motor 11b performs a powering operation for causing the upper swing structure 200 to swing and a regenerative operation for electrically recovering hydraulic energy during swing braking.

The generator motor 8b and the swing electric motor 11b can perform the powering operation not only by the electric power of the lithium-ion battery 12a but also by directly using other generated power or regenerative power without via the lithium-ion battery 12a.

The controller 13 receives operation signal information, a pump pressure, power mode information, and other vehicle body information from sensors and switches installed in the vehicle body as inputs, exercises control over a vehicle body system while holding communication with the ECU 7, the BCU 12b, the first inverter 8a, and the second inverter 11a. Controlling the vehicle body system includes controlling charge electric power and discharge electric power of the generator motor 8b and a delivery flow rate and an output torque of the hydraulic pump 9.

Furthermore, it is assumed herein that the engine 6 is a small-sized engine with an eye on reduction of fuel consumption and that maximum output power of the engine 6 is lower than maximum pump absorption power.

When such a small-sized engine is used, a rate at which the powering of the generator motor 8b at a time of vehicle body operation contributes to engine assist is high, compared with an engine having sufficiently higher output power than the maximum pump absorption power, so that the lithium-ion battery 12a repeats charge and discharge more frequently.

Particularly when heavy load work such as gravel loading is continuously conducted, then a battery discharge amount by the powering of the generator motor 8b is larger than a charge amount by power generation, and the charge rate of the lithium-ion battery 12a is reduced. Generally, overdischarge greatly deteriorates an output power performance of a battery.

A proper use range (30% to 70%) of the charge rate of the assumed lithium-ion battery 12a is defined by a manufacturer; when the lithium-ion battery 12a is used beyond this range, a deterioration speed greatly increases.

Therefore, in the light of a service life of the lithium-ion battery 12a, it is necessary to reduce the discharge amount of the lithium-ion battery 12a by reducing a vehicle body speed, that is, reducing operation output power when it is expected that the charge rate of the lithium-ion battery 12a deviates from the proper use range.

Explanation of Hydraulic System

Figure 3:
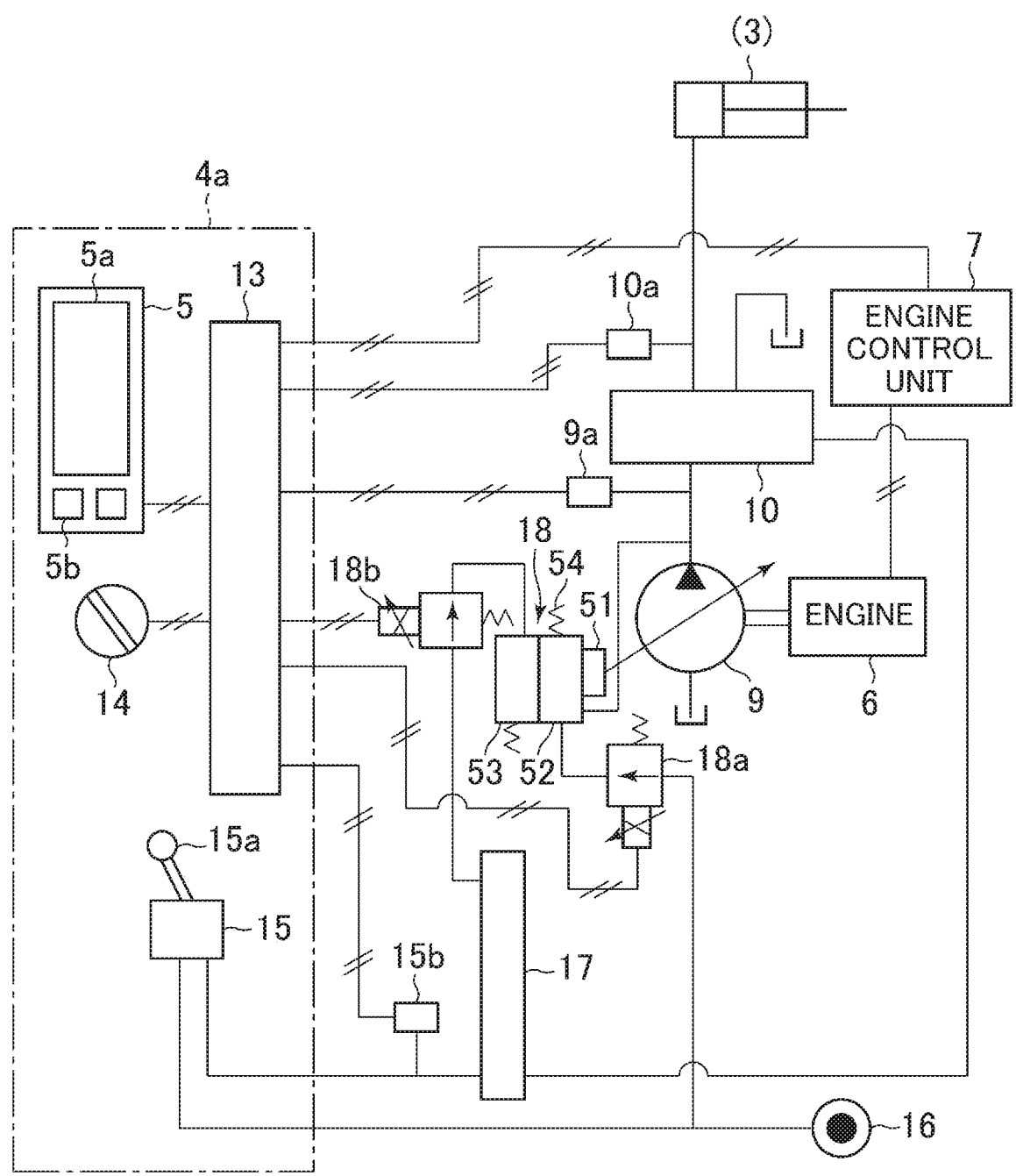
FIG. 3 shows an outline of a hydraulic system in the hybrid hydraulic excavator.

FIG. 3 shows an outline of a hydraulic system in the hybrid hydraulic excavator.

As shown in FIG. 3, in the operation room 4a of the hydraulic excavator, there are provided the controller 13 that exercises control over operations of the entire machine, the display device 5 that displays various information about the hydraulic excavator on the basis of a signal from the controller 13, an engine control dial (EC dial) 14 that instructs an engine speed of the engine 6 that is the prime mover to the machine controller 13, and the plurality of operation devices 15 (only one of which is shown in FIG. 3 for the sake of convenience) that output operation signals in response to operation amounts for a plurality of hydraulic actuators 3 (only one of which is shown in FIG. 3 for the sake of convenience) such as the boom cylinder 3d, the arm cylinder 3e, and the bucket cylinder 3f shown in FIG. 2 and that instruct the respective hydraulic actuators 3 to operate. Furthermore, the hydraulic excavator includes the engine 6 (for example, a diesel engine that is an internal combustion engine) that is the prime mover, the variable displacement hydraulic pump 9 driven by the engine 6, a fixed displacement pilot pump 16, the control valve 10 that controls a hydraulic fluid supplied to the plurality of hydraulic actuators 3 (only one of which is shown in FIG. 3 for the sake of convenience), an operating pressure control valve 17 that controls a pilot pressure (operation signal), that is, an operating pressure transmitted from each operation device 15 to the control valve 10, and a regulator 18 that controls a tilting angle (displacement, that is, capacity) of the hydraulic pump 9 and that controls the delivery flow rate of the hydraulic pump 9 (hereinafter, referred to as pump flow rate as appropriate).

The operation levers 15a are provided on the respective plurality of operation devices 15. The operating pressure is generated by operator's operating each operation lever 15a, and transmitted to the control valve 10 via the operating pressure control valve 17, thereby driving the corresponding actuator. The operating pressure control valve 17 has a plurality of hydraulic lines that output the operating pressures transmitted from the operation devices 15 as they are, and a plurality of shuttle valves that are connected to the plurality of hydraulic lines, that select the highest operating pressure among the operating pressures transmitted from the operation devices 15, and that generate a pump flow rate control pressure.

The EC dial 14 is a rotary dial-type instruction device that instructs a target engine speed of the engine 6 to the controller 13 by operator's rotation operation on the EC dial 14, and can instructs a minimum value, a maximum value, and a value between the minimum and maximum values in an instructable range of the engine speed of the engine 6 in a stepless fashion.

The engine control unit (ECU) 7 transmits and receives signals to and from the controller 13, controls the engine 6 to be driven on the basis of a control signal (the engine speed instructed by the EC dial 14 and the like) from the controller 13, and outputs information such as an engine speed (actual engine speed) and a fuel injection amount obtained from the engine 6 to the controller 13.

Regulator 18

The regulator 18 has a pump actuator 51 that drives a displacement change member (for example, swash plate) of the hydraulic pump 9, and a pump horsepower control valve 52 and a pump flow control valve 53 that control a driving pressure introduced to this pump actuator 51 and that control a displacement (for example, a tilting angle of the swash plate, hereinafter referred to as tilting angle as appropriate) of the hydraulic pump.

A delivery pressure of the hydraulic pump 9 (hereinafter, referred to as pump pressure as appropriate) is introduced to the pump horsepower control valve 52, and the pump horsepower control valve 52 limits a pump flow rate by a pump pressure in such a manner that absorption horsepower of the hydraulic pump 9 does not exceed reference maximum horsepower set by a spring 54.

The regulator 18 also has a pump horsepower limiting solenoid valve 18a. The pump horsepower limiting solenoid valve 18a outputs a pressure signal (horsepower control pressure) obtained by reducing a pilot primary pressure on the basis of a pump horsepower limiting command value that is a solenoid valve current command value (mA) from the controller 13 to the pump horsepower control valve 52.

The pump horsepower control valve 52 further limits a maximum value of the absorption horsepower (maximum horsepower) of the hydraulic pump 9 in accordance with the horsepower control pressure. When the horsepower control pressure is a minimum (0 MPa), the hydraulic pump 9 can be driven at the reference maximum horsepower set by the spring 54. When the horsepower control pressure is a maximum (4 MPa), the maximum horsepower of the hydraulic pump 9 is limited to a minimum.

On the other hand, the pump flow rate control pressure generated by the operating pressure control valve 17 on the basis of the operating pressures transmitted from the plurality of operation devices 15 to the control valve 10 is introduced to the pump flow control valve 53 of the regulator 18. The pump flow control valve 53 controls the tilting angle (displacement) of the hydraulic pump 9 on the basis of the pump flow rate control pressure, and controls the pump flow rate.

Furthermore, the regulator 18 has a pump flow rate limiting solenoid valve 18b. The pump flow rate limiting solenoid valve 18b reduces the pump flow rate control pressure generated by the operating pressure control valve 17 on the basis of a pump flow rate limiting command value that is a solenoid valve current command value (mA) from the controller 13, and outputs the resultant pump flow rate control pressure (as a pump flow rate limiting pressure) to the pump flow control valve 53 of the regulator 18.

When the pump flow rate limiting pressure is a minimum (0 MPa), a minimum flow rate is instructed to the hydraulic pump 9. When the pump flow rate limiting pressure is a maximum (4 MPa), a maximum flow rate is instructed to the hydraulic pump 9.

The pump horsepower control valve 52 and the pump flow control valve 53 control the driving pressure of the pump actuator 51 and hydraulically controls the tilting angle (displacement) of the hydraulic pump 9 in such a manner that a lower flow rate out of a limited flow rate by the pump pressure and the pump horsepower limiting pressure and a limited flow rate by the pump flow rate limiting pressure becomes a pump flow rate becomes a pump flow rate.

Figure 16:
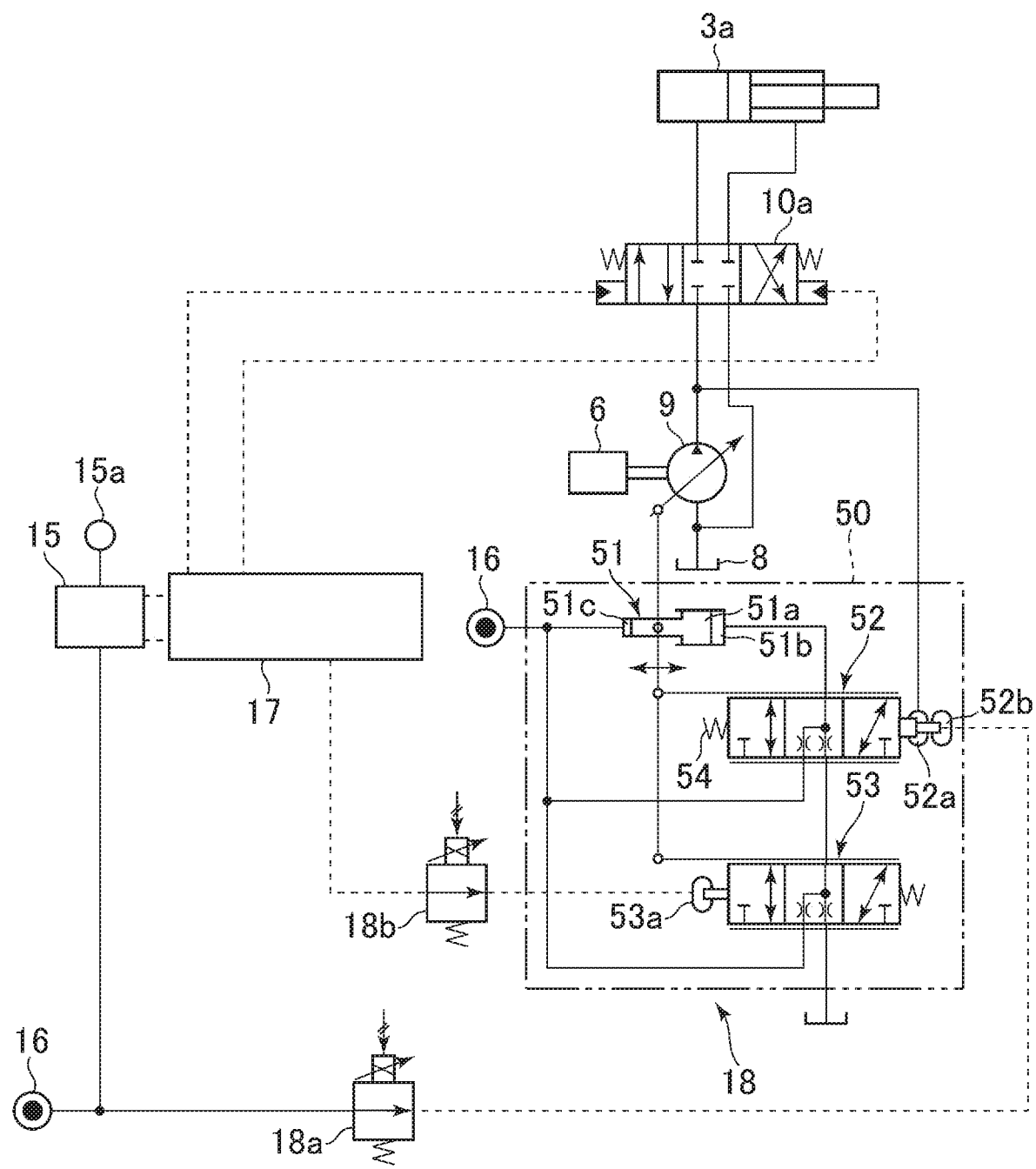
FIG. 16 shows details of a regulator.

FIG. 16 shows details of the regulator 18.

In FIG. 16, the regulator 18 has a regulator body 50. The regulator body 50 has the pump actuator 51 that drives the displacement change member of the hydraulic pump 9, and the pump horsepower control valve 52 and the pump flow control valve 53 that control the driving pressure introduced to this pump actuator 51 and that control the tilting angle of the hydraulic pump, as described above.

The pump actuator 51 is a servo piston provided with a stepped actuating piston 51a having a large-diameter pressure receiving section 51b and a small-diameter pressure receiving section 51c. The control pressure adjusted by the pump horsepower control valve 52 and the pump flow control valve 53 is introduced to the large-diameter pressure receiving section 51b, and a constant pilot pressure from the pilot pump 16 is introduced to the small-diameter pressure receiving section 51c. When the same constant pilot pressure from the pilot pump 16 is introduced to both of the pressure receiving sections 51b and 51c, then the actuating piston 51a moves in the left direction in FIG. 16 to reduce the tilting angle of the swash plate of the hydraulic pump 9 and to reduce the pump delivery flow rate. When the pressure introduced to the large-diameter pressure receiving section 51b falls, the actuating piston 51a moves in the right direction in FIG. 16 to increase the tilting angle of the swash plate of the hydraulic pump 9 and to increase the pump delivery flow rate.

The pump horsepower control valve 52 has a pressure receiving section 52a to which the delivery pressure of the hydraulic pump 9 is introduced, and a pressure receiving section 52b to which the horsepower control pressure output from the pump horsepower limiting solenoid valve 18a is introduced, and the spring 54 that sets the reference maximum horsepower described above is located on an opposite side to the pressure receiving sections 52a and 52b. The pump flow control valve 53 has a pressure receiving section 53a to which the pump flow rate limiting pressure output from the pump flow rate limiting solenoid valve 18b is introduced.

When the pump flow rate limiting pressure output from the pump flow rate limiting solenoid valve 18b falls, then a spool of the pump flow control valve 53 moves in the left direction in FIG. 16, the constant pilot pressure from the pilot pump 16 is introduced to the large-diameter pressure receiving section 51b through the pump flow control valve 53 and the pump horsepower control valve 52, the tilting angle of the hydraulic pump 9 is reduced, and the pump delivery flow rate decreases.

When the pump actuator 51 moves in the left direction in FIG. 16, a sleeve of the pump flow control valve 53 also moves in the left direction in FIG. 16 to be interlocked with movement of the pump actuator 51, and the large-diameter pressure receiving section 51b reaches a position at which the pilot pressure from the pilot pump 16 is interrupted (state of FIG. 16), then flow of the hydraulic working fluid into the large-diameter pressure receiving section 51b is stopped. Owing to this, the pump actuator 51 stops moving and a reduction of the pump delivery flow rate is stopped.

When the pump flow rate control pressure output from the pump flow rate limiting solenoid valve 18b rises, then the spool of the pump flow control valve 53 moves in the right direction in FIG. 16, the large-diameter pressure receiving section 51b is introduced to a drain (tank) through the pump horsepower control valve 52 and the pump flow control valve 53, the tilting angle of the hydraulic pump 9 is increased, and the pump delivery flow rate increases.

When the pump actuator 51 moves in the right direction in FIG. 16, the sleeve of the pump flow control valve 53 also moves in the right direction in FIG. 16 to be interlocked with movement of the pump actuator 51, and the large-diameter pressure receiving section 51b reaches a position at which a hydraulic line from the large-diameter pressure receiving section 51b to the drain (tank) is interrupted (state of FIG. 16), then flow of the hydraulic working fluid into the large-diameter pressure receiving section 51 is stopped. Owing to this, the pump actuator 51 stops moving and an increase of the pump delivery flow rate is stopped.

In this way, the pump flow control valve 53 exercises control over the pump delivery flow rate such that the pump delivery flow rate becomes the pump flow rate in response to the pump flow rate control pressure.

When a hydraulic force by the delivery pressure of the hydraulic pump 9 introduced to the pressure receiving section 52a is lower than a value of a difference between an urging force of the spring 54 and a hydraulic force by the horsepower control pressure of the pump horsepower limiting solenoid valve 18a introduced to the pressure receiving section 52b, then a spool of the pump horsepower control valve 52 moves in the right direction in FIG. 16 to communicate the large-diameter pressure receiving section 51b with the pump flow control valve 53, and the pump flow rate becomes the pump delivery flow rate determined by the pump flow control valve 53.

When the hydraulic force by the delivery pressure of the hydraulic pump 9 introduced to the pressure receiving section 52a is higher than the value of the difference between the urging force of the spring 54 and the hydraulic force by the horsepower control pressure from the pump horsepower limiting solenoid valve 18a introduced to the pressure receiving section 52b, the spool of the pump horsepower control valve 52 moves in the left direction in FIG. 16. When a relative position of the spool of the pump horsepower control valve 52 to the sleeve of the pump flow control valve 52 moves in the left direction in FIG. 16 from the position in the balanced state (state of FIG. 16), then the constant pilot pressure from the pilot pump 15 is introduced to the large-diameter pressure receiving section 51b through the pump horsepower control valve 52, the tilting angle of the hydraulic pump 9 is reduced, and the pump delivery flow rate decreases.

When the pump actuator 51 moves in the left direction in FIG. 16, the sleeve of the pump horsepower control valve 52 also moves in the left direction in FIG. 16 to be interlocked with movement of the pump actuator 51, and the large-diameter pressure receiving section 51b reaches the position at which the pilot pressure from the pilot pump 16 is interrupted (state of FIG. 16), then flow of the hydraulic working fluid into the large-diameter pressure receiving section 51b is stopped. Owing to this, the pump actuator 51 stops moving and the reduction of the pump delivery flow rate is stopped.

In this way, the delivery flow rate of the hydraulic pump 9 is reduced in response to the increase of the delivery pressure of the hydraulic pump 9, and the absorption horsepower of the hydraulic pump 9 is controlled in such a manner as not to exceed the maximum horsepower determined by the value of the difference between the urging force of the spring 54 and the hydraulic force by the horsepower control pressure from the pump horsepower limiting solenoid valve 18a introduced to the pressure receiving section 52b. In addition, the maximum horsepower is variable by the horsepower control pressure from the pump horsepower limiting solenoid valve 18a. When the horsepower control pressure from the pump horsepower limiting solenoid valve 18a is low, the maximum horsepower is increased. When the horsepower control pressure is equal to a tank pressure, the maximum horsepower is set equal to the reference maximum horsepower set by the spring 54. Furthermore, as the horsepower control pressure from the pump horsepower limiting solenoid valve 18a is higher, the maximum horsepower becomes lower.

Explanation of Operation for Pump Horsepower Limiting

Figure 4:
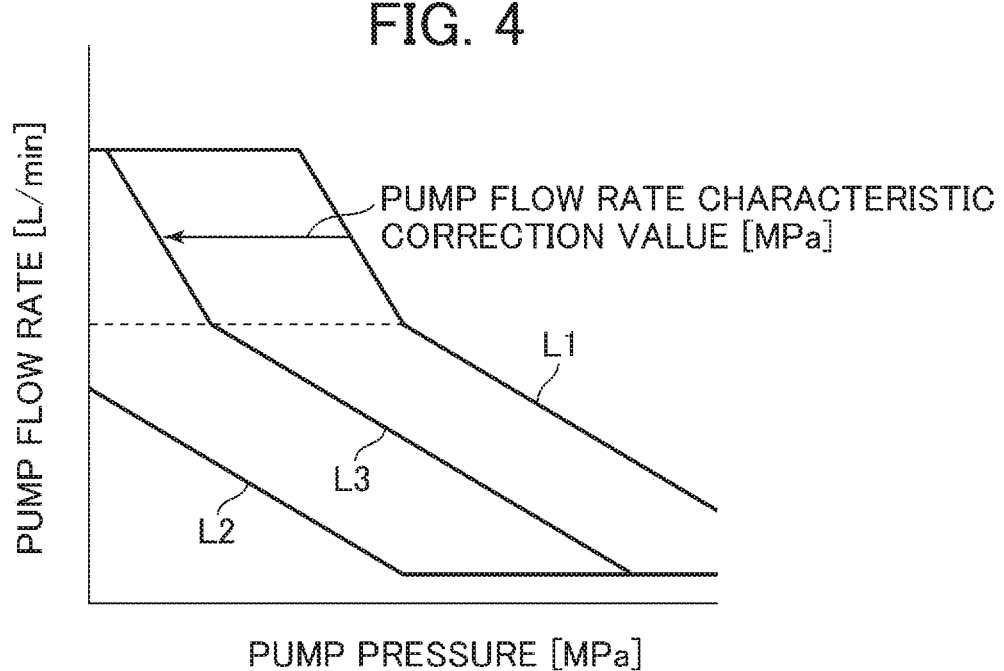
FIG. 4 is an operation explanatory diagram for pump horsepower limiting by a pump horsepower control valve 52.

FIG. 4 is an operation explanatory diagram for pump horsepower limiting by the pump horsepower control valve 52.

In FIG. 4, L1 is a line that represents characteristics of the pump flow rate relative to the pump pressure (pump average pressure if horsepower of the two pumps is full) when the horsepower control pressure generated by the pump horsepower limiting solenoid valve 18a is 0 MPa and the hydraulic pump 9 can output the reference maximum horsepower set by the spring 54.

L2 is a line that represents characteristics of the pump flow rate relative to the pump pressure (pump average pressure if horsepower of the two pumps is full) when the horsepower control pressure is 4 MPa and the maximum horsepower of the hydraulic pump 9 is limited to the minimum.

L3 is a line that represents characteristics of the pump flow rate relative to the pump pressure (pump average pressure if horsepower of the two pumps is full) when the horsepower control pressure is an arbitrary PT MPa.

The pump horsepower control valve 52 imposes pump horsepower limiting such that flow rate characteristics of the hydraulic pump 9 make a parallel translation to correct the pump pressure in accordance with the horsepower control pressure. A moving amount at this time is assumed to be expressed as pump flow rate characteristic correction value.

A relationship among the pump horsepower control pressure, the pump flow rate characteristic correction value, and the pump horsepower limiting command value is defined by characteristics (specifications) of the hydraulic pump 9, the regulator 18, and the pump horsepower limiting solenoid valve 18a. Owing to this, these values can be converted into one another.

Explanation of Operation for Pump Flow Rate Control

Figure 5:
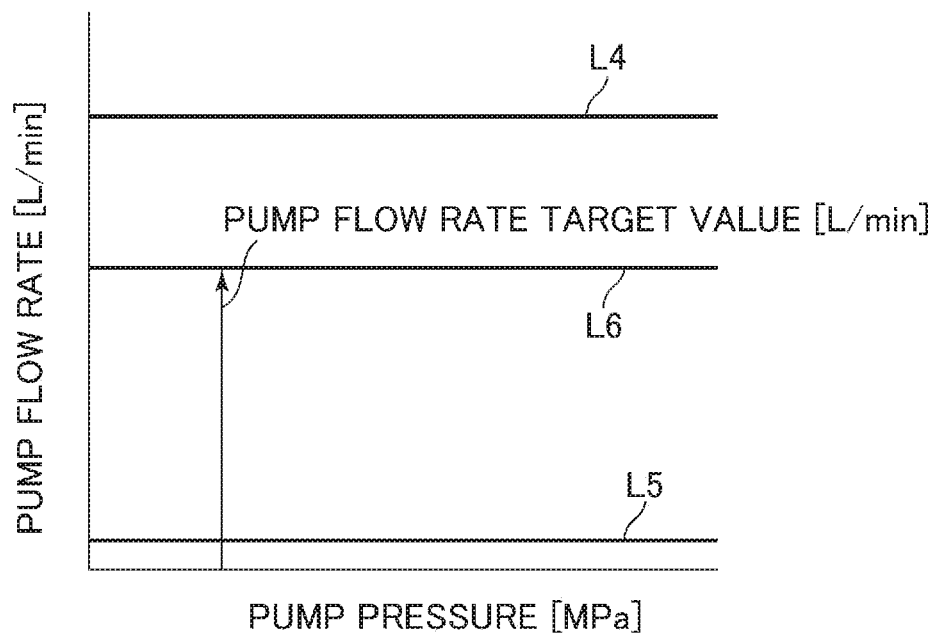
FIG. 5 is an operation explanatory diagram for pump flow rate control by a pump flow control valve.

FIG. 5 is an operation explanatory diagram of pump flow rate control by the pump flow control valve 53.

In FIG. 5, L4 is a line that represents characteristics of the pump flow rate relative to a pump pressure when the flow rate limiting pressure generated by the pump flow rate limiting solenoid valve 18b is 4 MPa and the hydraulic pump 9 can deliver the maximum flow rate.

L5 is a line that represent characteristics of the pump flow rate relative to the pump pressure when the flow rate limiting pressure is 0 MPa and the delivery flow rate of the hydraulic pump 9 is limited to the minimum.

L6 is a line that represents characteristics of the pump flow rate relative to the pump pressure when the flow rate limiting pressure is an arbitrary PQ MPa.

The pump flow control valve 53 imposes pump horsepower limiting such that an upper limit flow rate of the hydraulic pump 9 changes in accordance with the flow rate limiting pressure. The upper limit flow rate at this time is assumed to be expressed as pump flow rate target value. A relationship among the pump flow rate limiting pressure, the pump flow rate target value, and the pump flow rate limiting command value is defined by characteristics (specifications) of the hydraulic pump 9, the regulator 18, and the pump flow rate limiting solenoid valve 18b. Owing to this, these values can be converted into one another.

Explanation of Sensors

Furthermore, in a hydraulic circuit of the hydraulic system, there are provided a plurality of operating pressure sensors 15b (only one of which is shown in FIG. 3 for the sake of convenience) that detect the operating pressures (pilot pressures) from the plurality of operation devices 15, a pump pressure sensor 9a that detects the delivery pressure (pump pressure) of the hydraulic pump 9, and a plurality of actuator pressure sensors 10a (only one of which is shown in FIG. 3 for the sake of convenience) that detect pressures (actuator pressures) of the plurality of actuators. The sensors output detection signals to the machine controller 13.

Explanation of Monitor

The display device 5 includes a display section 5a that displays various information about the hydraulic excavator and a display operation section 5b to which various operations are input, and a display controller that is not shown controls display and operation of the various information. It is noted that the display device 5 may be configured such that the display section 5a is a touch panel liquid crystal monitor and also serves as the display operation section 5b.

Configuration of Control

Figure 6:
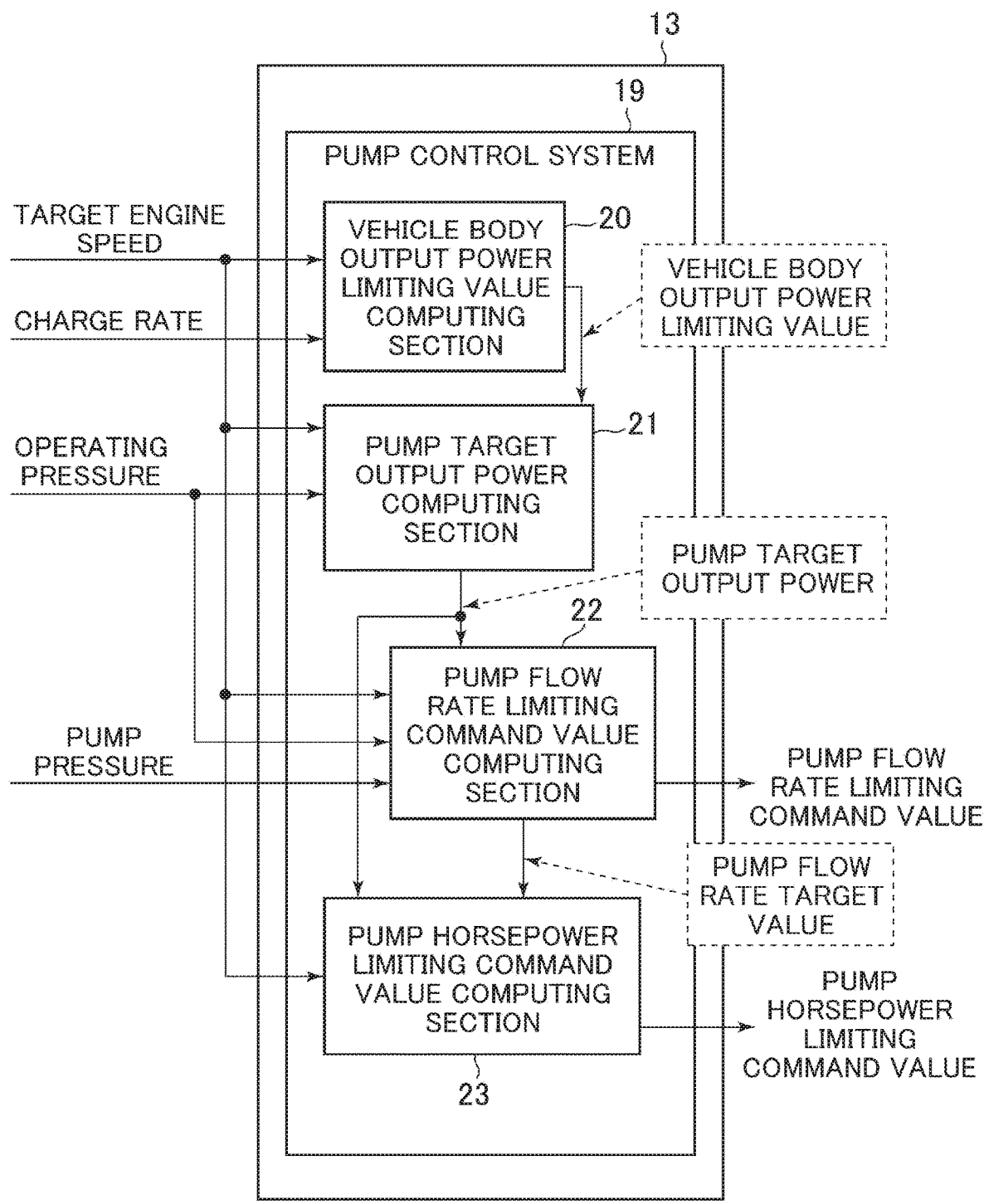
FIG. 6 shows a control configuration of a pump control system according to the first embodiment of the present invention.

FIG. 6 shows a control configuration of the pump control system according to the first embodiment of the present invention. The controller 13 includes the pump control system 19 as part of functions. Furthermore, the pump control system 19 includes a vehicle body output power limiting value computing section 20 that also serves as an electric-storage-device 12a state value monitoring section, a pump target output power computing section 21, a pump flow rate limiting command value computing section 22, and a pump horsepower limiting command value computing section 23.

The vehicle body output power limiting value computing section 20 receives a target engine speed determined by the EC dial 14 or the like and the charge rate of the electric storage device 12a that is the signal from the BCU 12b, and computes a vehicle body output power limiting value by the engine 6 and the generator motor 8b.

The pump target output power computing section 21 receives the plurality of operating pressures that are the signals from the plurality of operating pressure sensors 15b and the target engine speed, inputs therein the vehicle body output power limiting value computed by the vehicle body output power limiting value computing section 20, and computes present pump target output power.

The pump flow rate limiting command value computing section 22 receives the plurality of operating pressures, the delivery pressure (pump pressure) of the hydraulic pump 9 that is the signal from the pump pressure sensor 9a, and the target engine speed, inputs therein the pump target output power computed by the pump target output power computing section 21, and computes the pump flow rate target value and the pump flow rate limiting command value.

The pump horsepower limiting command value computing section 23 receives the target engine speed, inputs therein the target engine speed, the pump target output power computed by the pump target output power computing section 21, and the pump flow rate target value computed by the pump flow rate limiting command value computing section 22, and computes the pump horsepower limiting command value.

Furthermore, the vehicle body output power limiting value computing section 20 computes, as the vehicle body output power limiting value, pump maximum output power in a present state of charge of the electric storage device 12a. Moreover, the vehicle body output power limiting value computing section 20 computes the vehicle body output power limiting value allowable by a vehicle body on the basis of maximum output power of the engine 6 at a present engine speed and maximum output power of the generator motor 8b in the present state of charge of the electric storage device 12a.

The pump target output power computing section 21 computes present pump demanded power of the hydraulic pump 9 on the basis of work related information. In addition, the pump target output power computing section 21 limits the present pump demanded power in response to a degree of reduction of the state of charge of the electric storage device 12a when the state of charge of the electric storage device 12a acquired from the battery control unit (BCU) (electric storage control system) 12b is lower than a preset threshold (40%), and computes this limited present pump demanded power as the present pump target power. Moreover, the pump target output power computing section 21 computes a pump output power limiting value that is pump output power corresponding to the present state of charge of the electric storage device 12a on the basis of the vehicle body output power limiting value computed by the vehicle body output power limiting value computing section 20. In addition, the pump target output power computing section 21 performs computation to limit the present pump demanded power in response to the degree of reduction of the state of charge of the electric storage device 12a on the basis of this pump output power limiting value.

The pump flow rate limiting command value computing section 22 computes the pump flow rate limiting command value in such a manner that output power of the hydraulic pump 9 does not exceed the pump target output power on the basis of the present pump target output power. In addition, the pump flow rate limiting command value computing section 22 computes the pump flow rate target value on the basis of the plurality of operation signals and the pump target output power, and computes the pump flow rate limiting command value by converting this pump flow rate target value into a target displacement of the hydraulic pump 9.

The pump horsepower limiting command value computing section 23 computes the pump horsepower limiting command value for exercising control over the pump horsepower control valve 52 such that the delivery flow rate of the hydraulic pump 9 limited by the pump horsepower control valve 52 matches the pump flow rate target value computed by the pump flow rate limiting command value computing section 22.

Details of the computing sections will be explained below.

Vehicle Body Output Power Limiting Value Computing Section 20

Figure 7:
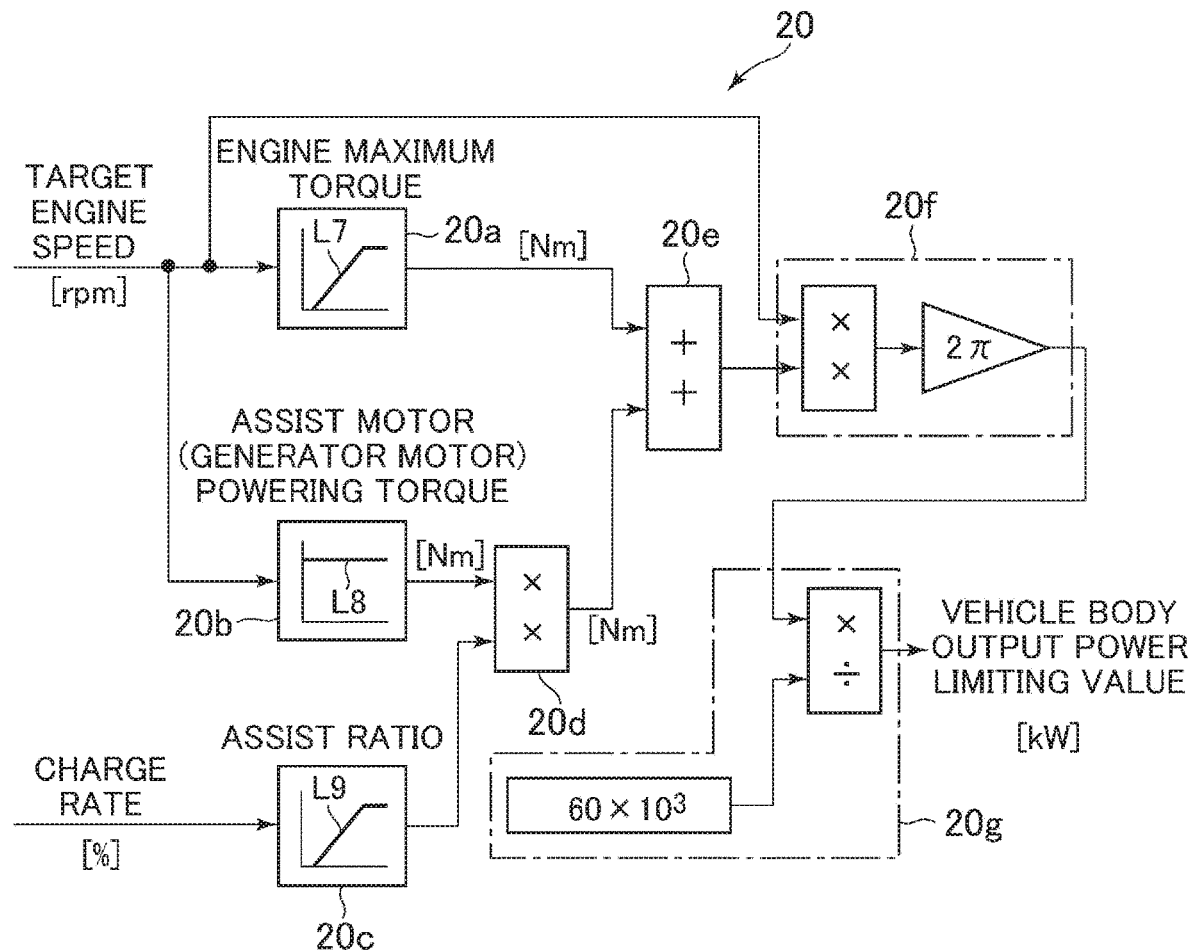
FIG. 7 shows contents of control by a vehicle body output power limiting value computing section according to the first embodiment of the present invention.

FIG. 7 shows contents of control by the vehicle body output power limiting value computing section 20 according to the first embodiment of the present invention.

In FIG. 7, the vehicle body output power limiting value computing section 20 has an engine maximum torque computing section 20a, an assist powering torque computing section 20b, an assist ratio computing section 20c, a multiplication section 20d, an addition section 20e, a horsepower computing section 20f, and an output power limiting value computing section 20g.

The engine maximum torque computing section 20a is a control table in which characteristics L7 of an engine maximum torque relative to the target engine speed are set, and computes the engine maximum torque corresponding to the target engine speed at the time from the target engine speed. The characteristics L7 of the engine maximum torque relative to the target engine speed may be set in accordance with specifications of the engine 6 to be used.

The assist powering torque computing section 20b is a control table in which characteristics L8 of a maximum powering torque of the generator motor 8b relative to the target engine speed are set, and calculates a maximum powering torque of the generator motor 8b corresponding to the target engine speed at the time from the target engine speed. The characteristics L8 of the maximum powering torque of the generator motor 8b relative to the target engine speed may be set in accordance with specifications of the generator motor 8b to be used.

As basic computation of the vehicle body output power limiting value, a sum of the engine maximum torque and the maximum powering torque is multiplied by the engine speed, and allowable output power (vehicle body output power allowable value) by the vehicle body at the present engine speed is computed by the engine maximum torque computing section 20a, the assist powering torque computing section 20b, the addition section 20e, the horsepower computing section 20f, and the output power limiting value computing section 20g.

The assist ratio computing section 20c is a control table in which characteristics L9 of an assist ratio relative to the charge rate of the electric storage device 12a are set, and calculates an assist ratio corresponding to the charge rate at the time from the charge rate. The multiplication section 20d multiplies the maximum powering torque computed by the assist powering torque computing section 20b by the assist ratio to calculate the maximum powering torque used for computing the vehicle body output power limiting value.

The characteristics L9 of the assist ratio relative to the charge rate are such that the assist ratio is 1 when the charge rate is high and the assist ratio is 0 when the charge rate is low. The maximum powering torque used for computing the vehicle body output power limiting value is changed in response to the charge rate by multiplying the maximum powering torque computed by the assist powering torque computing section 20b by the assist ratio. In other words, the assist powering torque computing section 20b computes the vehicle body output power limiting value using the charge rate that is a state value of the electric storage device 12a.

Figure 8:
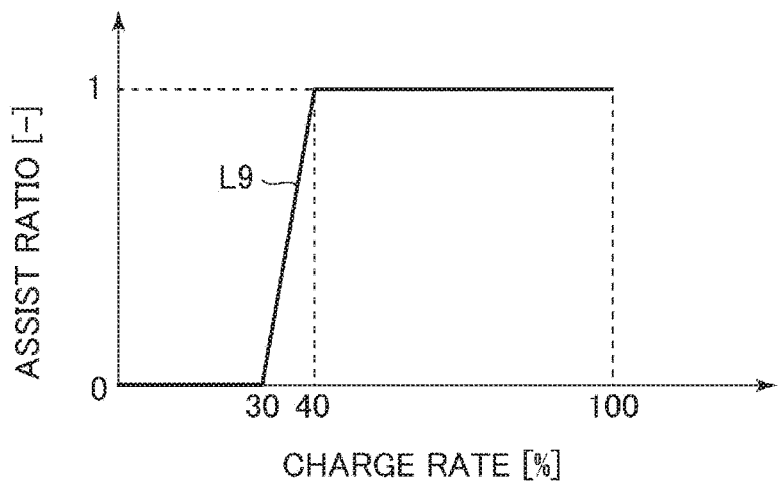
FIG. 8 shows an example of characteristics of an assist ratio relative to a charge rate in an assist ratio computing section.

FIG. 8 shows an example of the characteristics L9 of the assist ratio relative to the charge rate in the assist ratio computing section 20c. The assist ratio is set to 1 at the charge rate of 40%, whereby the vehicle body output power limiting value corresponds to maximum power of the vehicle body. The assist ratio is set to 0 at the charge rate of 30%, whereby the vehicle body output power limiting value corresponds to output power of only the engine 6. The assist ratio linearly decreases from 1 to 0 between 40% and 30% of the charge rate.

Pump Target Output Power Computing Section 21

Figure 9:
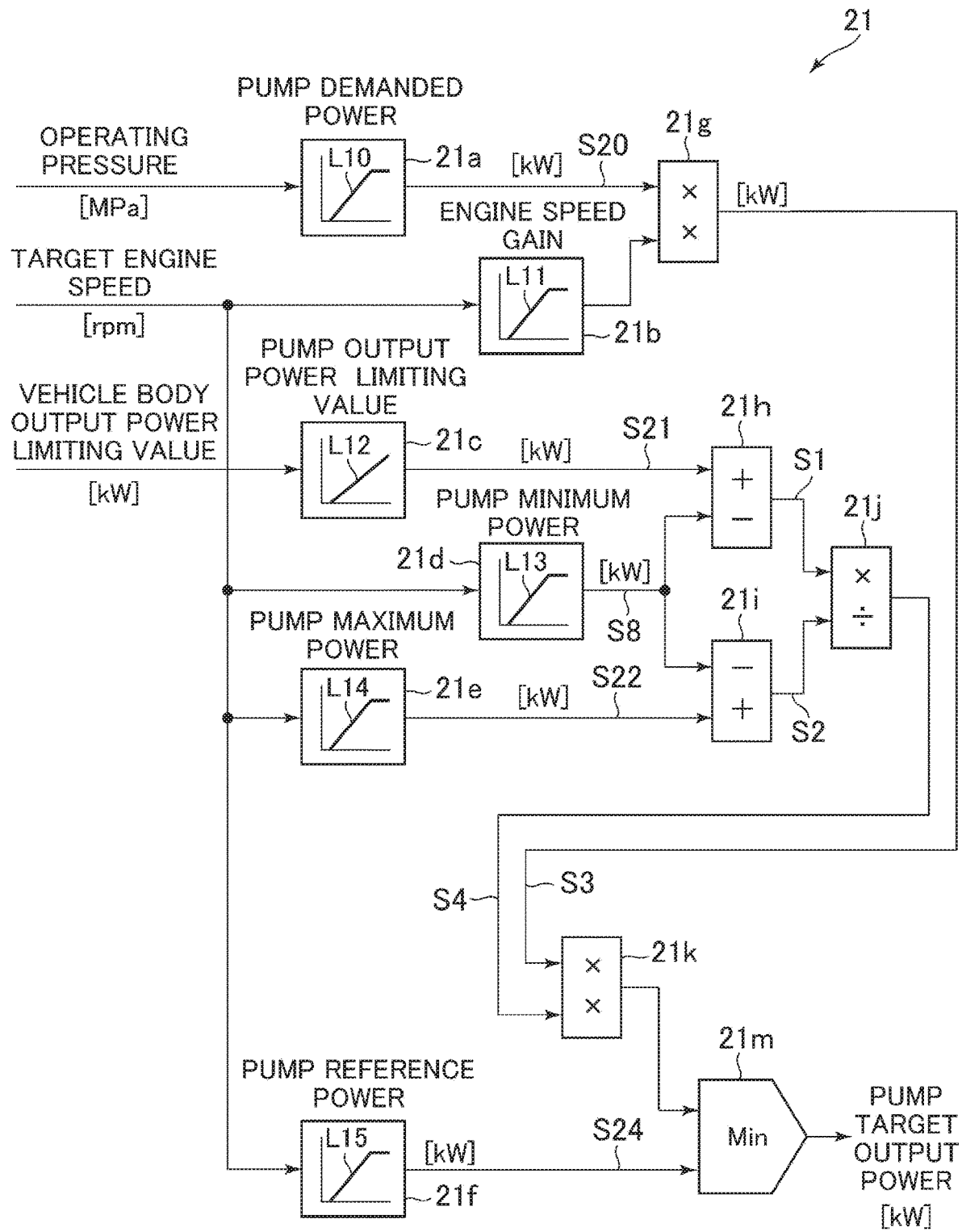
FIG. 9 shows contents of control by a pump target output power computing section according to the first embodiment of the present invention.

FIG. 9 shows contents of control by the pump target output power computing section 21 according to the first embodiment of the present invention.

In FIG. 9, the pump target output power computing section 21 has a pump demanded power computing section 21a, an engine speed gain computing section 21b, a pump output power limiting value computing section 21c, a pump minimum power setting section 21d, a pump maximum power setting section 21e, a pump reference power computing section 21f, a multiplication section 21g, a subtraction section 21h, a subtraction section 21i, a division section 21j, a multiplication section 21k, and a minimum value selection section 21m.

The pump demanded power computing section 21a is a control table in which characteristics L10 of a plurality of pump demanded power in response to the respective plurality of operating pressures (operation signals) are set, and calculates present pump demanded power S20 corresponding to the operating pressure (operation signal) at the time from the operating pressure (operation signal). The characteristics L10 of the plurality of pump demanded power have optimum maximum demanded power (to be described later) in response to a type of driving or work (for example, excavation or swing/boom raising) of each actuator corresponding to the operating pressure, and are set such that only the pump power necessary to drive the actuator is output. Therefore, it is possible to exercise pump control non-wastefully with good fuel economy. The characteristics L10 of the pump demanded power are set while it is assumed that the engine speed is maximum engine speed.

The engine speed gain computing section 21b is a control table in which characteristics L11 of a gain having a maximum of 1 in response to the target engine speed are set, and calculates an engine speed gain corresponding to the target engine speed at the time from the target engine speed. The characteristics L10 are set while it is assumed that the engine speed is the maximum engine speed. Owing to this, when the engine speed is low, the gain is set lower than 1 and the output power is adjusted by the gain in such a manner that output power is responsive to the engine speed.

The multiplication section 21g multiplies the pump demanded power S2 computed by the pump demanded power computing section 21a by the engine speed gain computed by the engine speed gain computing section 21b to calculate pump demanded power S3 as the pump target output power (hereinafter referred to as pump target output power S3).

The pump output power limiting value computing section 21c is a control table in which characteristics L12 for converting the vehicle body output power limiting value computed by the vehicle body output power limiting value computing section 20 into a value corresponding to pump output power, and calculates a pump output power limiting value S21 corresponding to the vehicle body output power limiting value at the time from the vehicle body output power limiting value. The pump output power limiting value S21 is the pump maximum output power in the present state of charge of the electric storage device 12a (maximum output power supplied to or allowed for the vehicle body by the electric storage device 12a). Furthermore, the vehicle body output power limiting value is a value that includes demanded power of all driven sections including the hydraulic pump 9 and auxiliary machines. Owing to this, to handle the vehicle body output power limiting value as the pump output power limiting value S21, a load of the auxiliary machines is subtracted from the vehicle body output power limiting value and a resultant value is converted into the pump output power limiting value in the light of power transmission efficiency from the engine 6 to the hydraulic pump 9.

The pump minimum power setting section 21d is a control table in which characteristics L13 of pump minimum power in response to the target engine speed are set, and calculates pump minimum power S8 corresponding to the target engine speed at the time from the target engine speed. The pump minimum power denotes stationary output power of the hydraulic pump 9 that can be driven solely by the engine 6 without the need of assist from the generator motor 8b. As the characteristics L13, a value into which the vehicle body output power limiting value at the assist ratio of 0 (minimum) is converted using the characteristics L12 may be basically set.

The pump maximum power setting section 21e is a control table in which characteristics L14 of pump maximum power in response to the target engine speed are set, and calculates pump maximum power S22 corresponding to the target engine speed at the time from the target engine speed. The pump maximum power is a pump output power limiting maximum value corresponding to a normal state in which the state of charge of the electric storage device 12a is equal to or higher than the threshold (40%). In other words, the pump maximum power is pump maximum output power as that of the vehicle body obtained by a sum of the maximum output power of the engine 6 and assist maximum output power of the generator motor 8b. As the characteristics L14, a value into which the vehicle body output power limiting value at the assist ratio of 1 (maximum) is converted using the characteristics L12 may be basically set.

The subtraction section 21h subtracts the pump minimum power S8 computed by the pump minimum power setting section 21d from the pump output power limiting value S21 computed by the pump output power limiting value computing section 21c, and outputs a resultant difference as allowable assist power S1 for the hydraulic pump 9.

The subtraction section 21i subtracts the pump minimum power S8 computed by the pump minimum power setting section 21d from the pump maximum power S22 computed by the pump maximum power setting section 21e, and outputs a resultant difference as maximum assist power S2 for the hydraulic pump 9.

The division section 21j divides the allowable assist power S1 by the maximum assist power S2 to compute a proportion S4 of the allowable assist power S1 in the maximum assist power S2. This proportion S4 is used as a limiting ratio for limiting the pump target output power S3 that is the present pump demanded power in the multiplication section 21k. This limiting ratio S4 is a value that denotes the degree of reduction of the state of charge of the electric storage device 12a when the state of charge of the electric storage device 12a is lower than 40% that is the preset threshold.

The multiplication section 21k calculates pump target output power S5 by multiplying the pump target output power S3 calculated by the multiplication section 21g by the limiting ratio S4.

In other words, when the charge amount of the electric storage device 12a is sufficient (equal to or higher than 40%), the assist ratio computed by the assist ratio computing section 20c is 1. Therefore, the vehicle body output power limiting value becomes a maximum, and the pump output power limiting value S21 computed by the pump output power limiting value computing section 21c is equal to the pump maximum power S22 computed by the pump maximum power setting section 21e. As a result, the allowable assist power S1 is equal in value to the maximum assist power S2 and the limiting ratio S4 becomes 1; thus, it is possible to output the pump demanded power S3 computed by the multiplication section 21g without limitation.

When the charge amount of the electric storage device 12a deteriorates with respect to the threshold (equal to or lower than 40%), for example, when the charge amount is 35%, the assist ratio computed by the assist ratio computing section 20c becomes 0.5. The vehicle body output power limiting value is thus a value to which 50% of assist output power is added. At this time, the allowable assist power S1 is 50% of the maximum assist power S2 and the limiting ratio S4 becomes 0.5; thus, the pump demanded power S3 computed by the multiplication section 21g is limited to 50%.

The pump reference power computing section 21f is a control table in which characteristics L15 of reference power of the hydraulic pump 9 in response to the target engine speed are set, and calculates pump reference power S24 corresponding to the target engine speed at the time from the target engine speed. The pump reference power computing section 21f sets an upper limit of the output power of the hydraulic pump 9 irrespective of the demanded power by the operating pressure in such a manner that the pump output power is not excessive with respect to the engine output power.

The minimum value selection section 21m selects lower power out of the pump target output power S5 calculated by the multiplication section 21k and the pump reference power S24 calculated by the pump reference power computing section 21f, and determines the selected power as final pump target output power.

Figure 17:
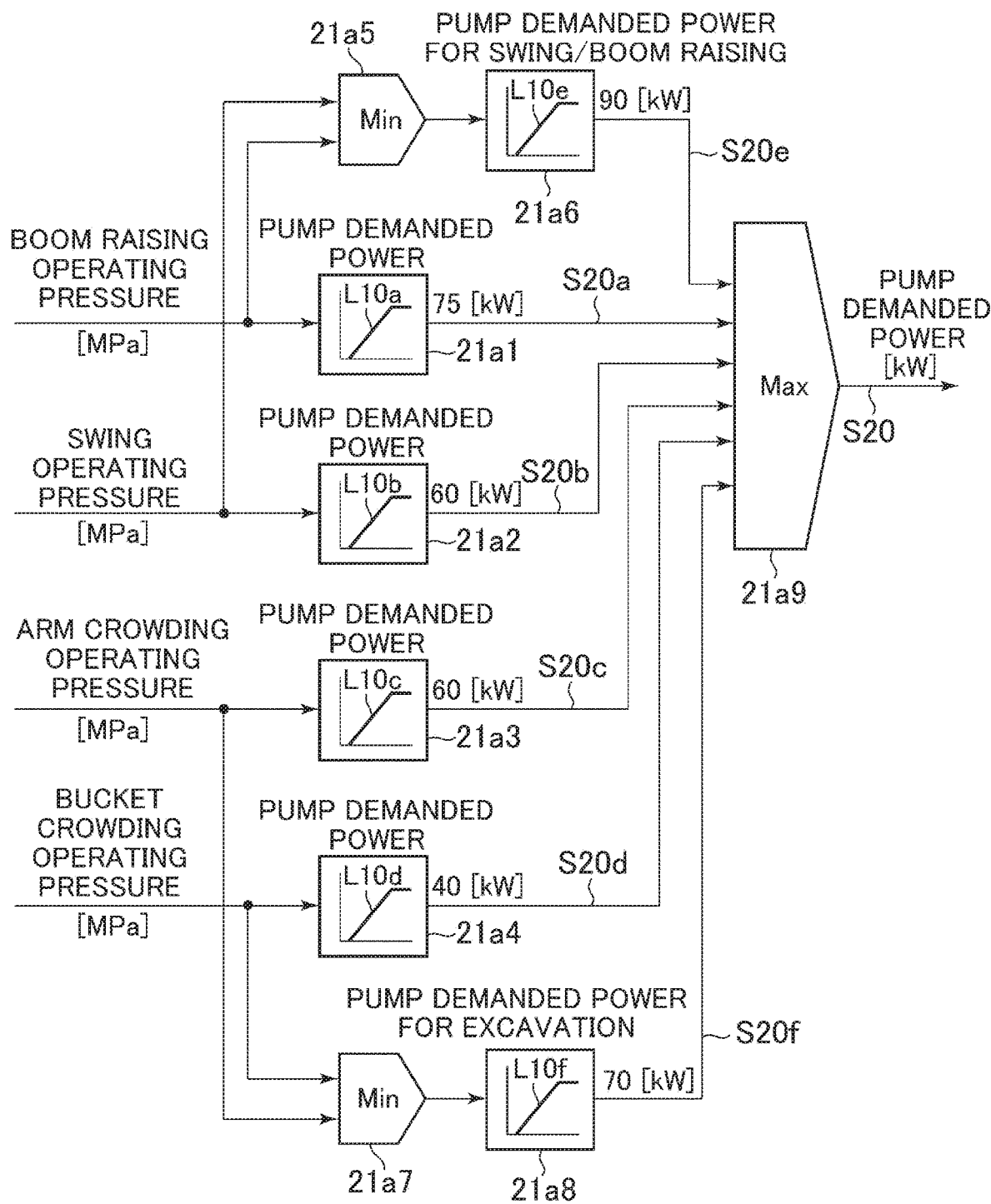
FIG. 17 shows details of a pump demanded power computing section shown in FIG. 9.

FIG. 17 specifically shows part of the pump demanded power computing section 21a shown in FIG. 9. By way of example, computation of pump demanded power related to boom raising, swing, arm crowding, bucket crowding, swing/boom raising, and excavation is shown. The pump demanded power computing section 21a has a boom raising demanded power computing section 21a1, a swing demanded power computing section 21a2, an arm crowding demanded power computing section 21a3, a bucket crowding demanded power computing section 21a4, a minimum value selection section 21a5, a swing/boom raising demanded power computing section 21a6, a minimum value selection section 21a7, an excavation demanded power computing section 21a8, and a maximum value selection section 21a9.

The boom raising demanded power computing section 21a1 is a control table in which characteristics L10a of pump demanded power in response to the operating pressure for boom raising are set, and calculates pump demanded power S20a corresponding to the operating pressure (operation signal) at the time from the operating pressure (operation signal). The characteristics L10a of the pump demanded power are set such that the pump demanded power becomes maximum demanded power in a region in which the operating pressure is equal to or higher than a constant operating pressure. The maximum demanded power for the boom raising is, for example, 75 kW.

The swing demanded power computing section 21a2 is a control table in which characteristics L10b of pump demanded power in response to the operating pressure for swing are set, and calculates pump demanded power S20b corresponding to the operating pressure (operation signal) at the time from the operating pressure (operation signal). The characteristics L10b of the pump demanded power are set such that the pump demanded power becomes the maximum demanded power in a region in which the operating pressure is equal to or higher than a constant operating pressure. The maximum demanded power for the swing is, for example, 60 kW.

The arm crowding demanded power computing section 21a3 is a control table in which characteristics L10c of pump demanded power in response to the operating pressure for arm crowding are set, and calculates pump demanded power S20c corresponding to the operating pressure (operation signal) at the time from the operating pressure (operation signal). The characteristics L10c of the pump demanded power are set such that the pump demanded power becomes maximum demanded power in a region in which the operating pressure is equal to or higher than a constant operating pressure. The maximum demanded power for the arm crowding is, for example, 60 kW.

The bucket crowding demanded power computing section 21a4 is a control table in which characteristics L10d of pump demanded power in response to the operating pressure for bucket crowding are set, and calculates pump demanded power S20d corresponding to the operating pressure (operation signal) at the time from the operating pressure (operation signal). The characteristics L10d of the pump demanded power are set such that the pump demanded power becomes maximum demanded power in a region in which the operating pressure is equal to or higher than a constant operating pressure. The maximum demanded power for the bucket crowding is, for example, 40 kW.

The characteristics L10a, L10b, L10c, and L10d of the pump demanded power have optimum maximum demanded power for driving the corresponding actuators, and are set such that only the pump demanded power necessary to drive the boom cylinder 3d in a boom raising direction, drive the swing hydraulic motor 3g, drive the arm cylinder 3e in an arm crowding direction, or drive the bucket cylinder 3f in a bucket crowding direction is output. Therefore, it is possible to exercise pump control non-wastefully with good fuel economy. These characteristics L10a, L10b, L10c, and L10d of the pump demanded power are set while it is assumed that the engine speed is the maximum engine speed.

The minimum value selection section 21a5 selects a lower operating pressure out of the operating pressure for the boom raising and the operating pressure for the swing, and outputs the selected operating pressure as the operating pressure for swing/boom raising.

The swing/boom raising demanded power computing section 21a6 is a control table in which characteristics L10e of pump demanded power in response to the operating pressure for swing/boom raising are set, and calculates pump demanded power S20e corresponding to the operating pressure (operation signal) for the swing/boom raising selected by the minimum value selection section 21a5 at the time from the operating pressure (operation signal). The characteristics L10e of the pump demanded power are set such that the pump demanded power becomes maximum demanded power in a region in which the operating pressure is equal to or higher than a constant operating pressure. The maximum demanded power for the swing/boom raising is, for example, 90 kW higher than maximum demanded power for excavation described below. The characteristics L10e of the pump demanded power have optimum maximum demanded power for the swing/boom raising, and are set such that only the pump power necessary for the swing/boom raising is output. Therefore, it is possible to exercise pump control non-wastefully with good fuel economy. The characteristics L10e of the pump demanded power are set while it is assumed that the engine speed is the maximum engine speed.

The minimum value selection section 21a7 selects a lower operating pressure out of the operating pressure for the arm crowding and the operating pressure for the bucket crowding, and outputs the selected operating pressure as the operating pressure for excavation.

The excavation demanded power computing section 21a8 is a control table in which characteristics L10f of pump demanded power in response to the operating pressure for excavation are set, and calculates pump demanded power S20f corresponding to the operating pressure (operation signal) for the excavation selected by the minimum value selection section 21a7 at the time from the operating pressure (operation signal). The characteristics L10f of the pump demanded power are set such that the pump demanded power becomes maximum demanded power in a region in which the operating pressure is equal to or higher than a constant operating pressure. The maximum demanded power for the excavation is, for example, 70 kW. The characteristics L10f of the plurality of pump demanded power have optimum maximum demanded power for the excavation, and are set such that only the pump power necessary for the excavation is output. Therefore, it is possible to exercise pump control non-wastefully with good fuel economy. The characteristics L10f of the pump demanded power are set while it is assumed that the engine speed is maximum engine speed.

The maximum value selection section 21a9 selects the maximum pump demanded power among the pump demanded power S20a to S20f computed by the boom raising demanded power computing section 21a1, the swing demanded power computing section 21a2, the arm crowding demanded power computing section 21a3, the bucket crowding demanded power computing section 21a4, the swing/boom raising demanded power computing section 21a6, and the excavation demanded power computing section 21a8, and outputs the selected power as the pump demanded power S20.

It is noted that pump demanded power is calculated for operations including travelling, boom lowering, arm dumping, bucket dumping, and preparation (attachment) other than the boom lowering, the swing, the arm crowding, the bucket crowding, the swing/boom raising, and the excavation shown herein. The maximum value selection section 21a9 selects a maximum value for each operation. Furthermore, only the swing/boom raising and the excavation are explained as types of compound operations in the present embodiment; however, operations for individually setting the pump demanded power other than these operations may be set as needed.

Figure 10:
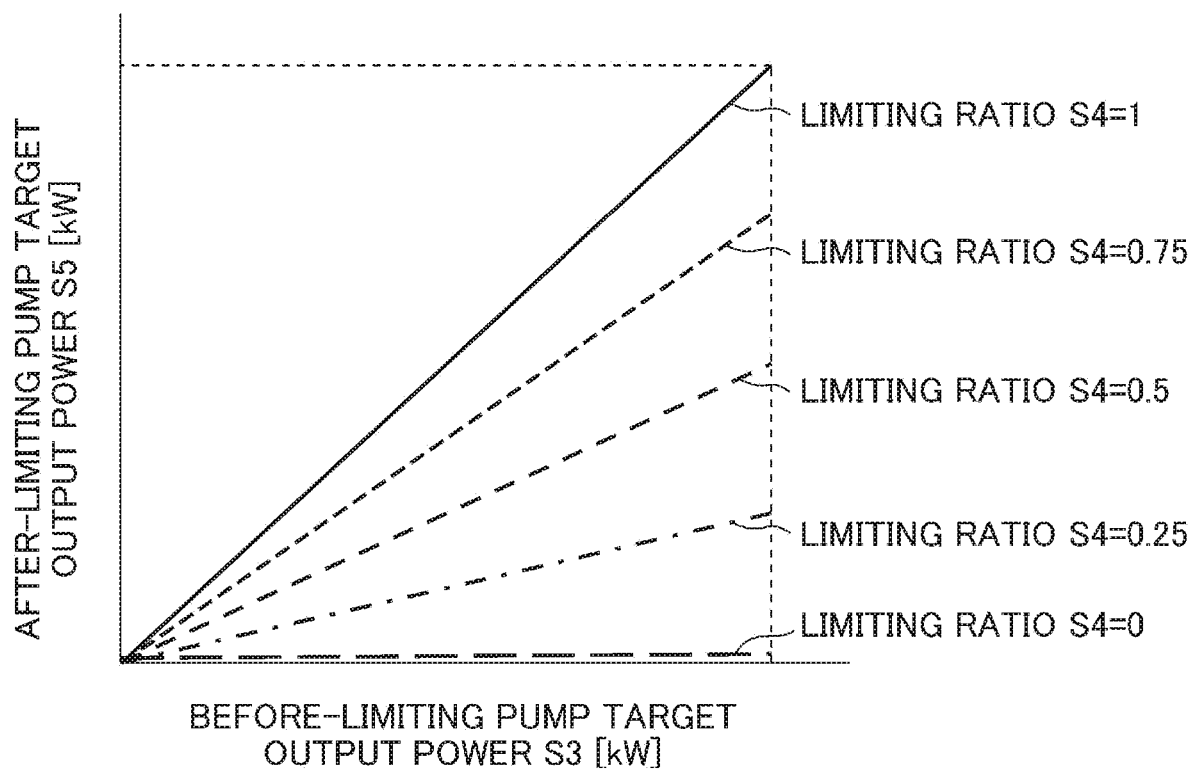
FIG. 10 shows limiting on pump target output power by a pump output power limiting ratio S4 based on a vehicle body output power allowable value while a horizontal axis represents before-limiting first pump target output power S3 and a vertical axis represents after-limiting second pump target output power S5.

FIG. 10 shows limiting on pump target output power by the limiting ratio S4 of the pump output power based on the vehicle body output power limiting value while a horizontal axis represents the before-limiting pump target output power S3 and a vertical axis represents the after-limiting pump target output power S5.

When the limiting ratio S4 is 1, the pump target output power is not limited; thus, the before-limiting pump target output power S3 is equal to the after-limiting pump target output power S5. As the limiting ratio S4 is lower, the after-limiting pump target output power S5 becomes lower. When the limiting ratio S4 is 0, the pump target output power S5 becomes 0.

Pump Flow Rate Limiting Command Value Computing Section 22

Figure 11:
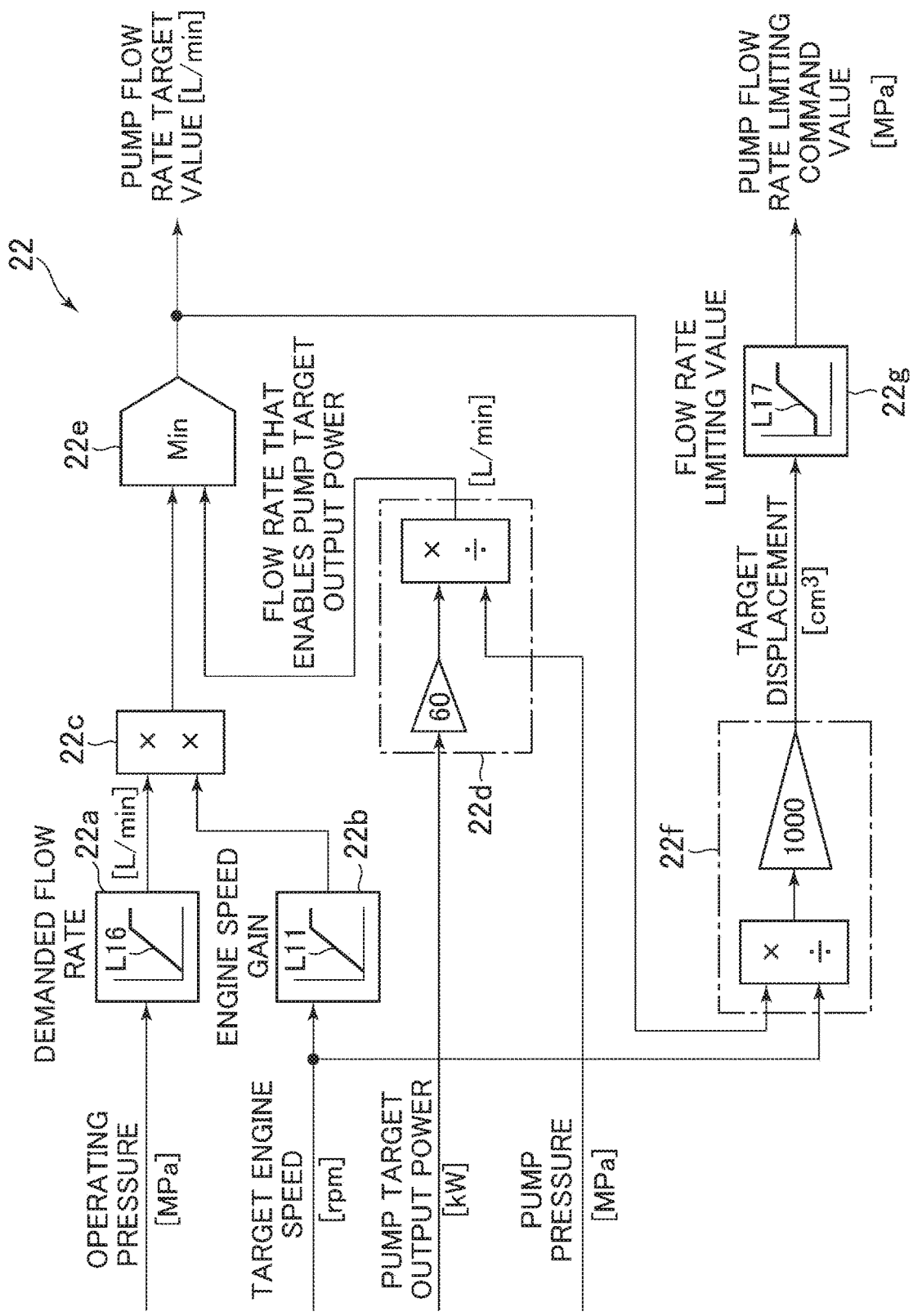
FIG. 11 shows contents of control by a pump flow rate limiting command value computing section according to the first embodiment of the present invention.

FIG. 11 shows contents of control by the pump flow rate limiting command value computing section 22 according to the first embodiment of the present invention.

In FIG. 11, the pump flow rate limiting command value computing section 22 has a demanded flow rate computing section 22a, an engine speed gain computing section 22b, a multiplication section 22c, a target flow rate computing section 22d, a minimum value selection section 22e, a target displacement computing section 22f, and a flow rate limiting value computing section 22g.

The demanded flow rate computing section 22a is a control table in which characteristics L16 of a plurality of pump demanded flow rates in response to the plurality of operating pressures (operation signals) are set, and calculates a present pump demanded flow rate corresponding to the operating pressure (operation signal) at the time from the operating pressure (operation signal). The characteristics L16 of the pump demanded flow rate are set such that only the necessary pump flow rate is output to correspond to the operation signal. Therefore, it is possible to exercise pump control non-wastefully with good fuel economy. The characteristics L16 of the pump demanded flow rate are set while it is assumed that the engine speed is the maximum engine speed.

The engine speed gain computing section 22b is a control table in which characteristics L11 of the gain having the maximum of 1 in response to the target engine speed are set, and calculates an engine speed gain corresponding to the target engine speed at the time from the target engine speed, similarly to the engine speed gain computing section 21b shown in FIG. 9. When the target engine speed is lower than the maximum engine speed, the engine speed gain computing section 22b computes an engine speed gain in response to the target engine speed at the time using the characteristics L11 of the gain. The multiplication section 22c multiplies this engine speed gain by the pump demanded flow rate calculated by the demanded flow rate computing section 22a, thereby adjusting the pump demanded flow rate to a flow rate in response to the target engine speed.

The target flow rate computing section 22d computes the pump flow rate that enables the present pump target output power using the pump target output power that is a computation result of the pump target output power computing section 21 and the delivery pressure (pump pressure) of the hydraulic pump 9 that is the signal from the pump pressure sensor 9a. The actuator pressure that is the signal from one of the actuator pressure sensors 9b may be used as an alternative to the pump pressure. In this case, since the plurality of actuator pressure sensors 9b are present, the highest pressure among the actuator pressures may be selected and used.

The minimum value selection section 22e selects a lower flow rate out of the demanded flow rate based on the operating pressure and the pump flow rate that enables the pump target output power, and determines the pump flow rate target value. With such a configuration, the pump flow rate is controlled such that the pump flow rate is suppressed to be equal to or lower than the flow rate that enables the pump target output power while the necessary pump flow rate is delivered in response to the operating pressure, and that the output power of the hydraulic pump 9 does not exceed the pump target output power. It is thereby possible to control the fuel consumption and the remaining charge amount. The pump flow rate target value computed here corresponds to the pump flow rate target value shown in FIG. 5.

The target displacement computing section 22f computes a pump target displacement by dividing the pump flow rate target value determined by the minimum value selection section 22e by the target engine speed.

The flow rate limiting value computing section 22g is a control table in which characteristics L17 of a pump flow rate limiting command value in response to the pump target displacement are set, and calculates a pump flow rate limiting command value corresponding to the pump target displacement at the time from the pump target displacement. The characteristics L17 are set in accordance with specifications of the hydraulic pump 9.

The controller 13 controls the pump flow rate by controlling the pump flow rate limiting solenoid valve 18b of the regulator 18 in such a manner that the pump flow rate limiting command value is obtained.

Figure 18:
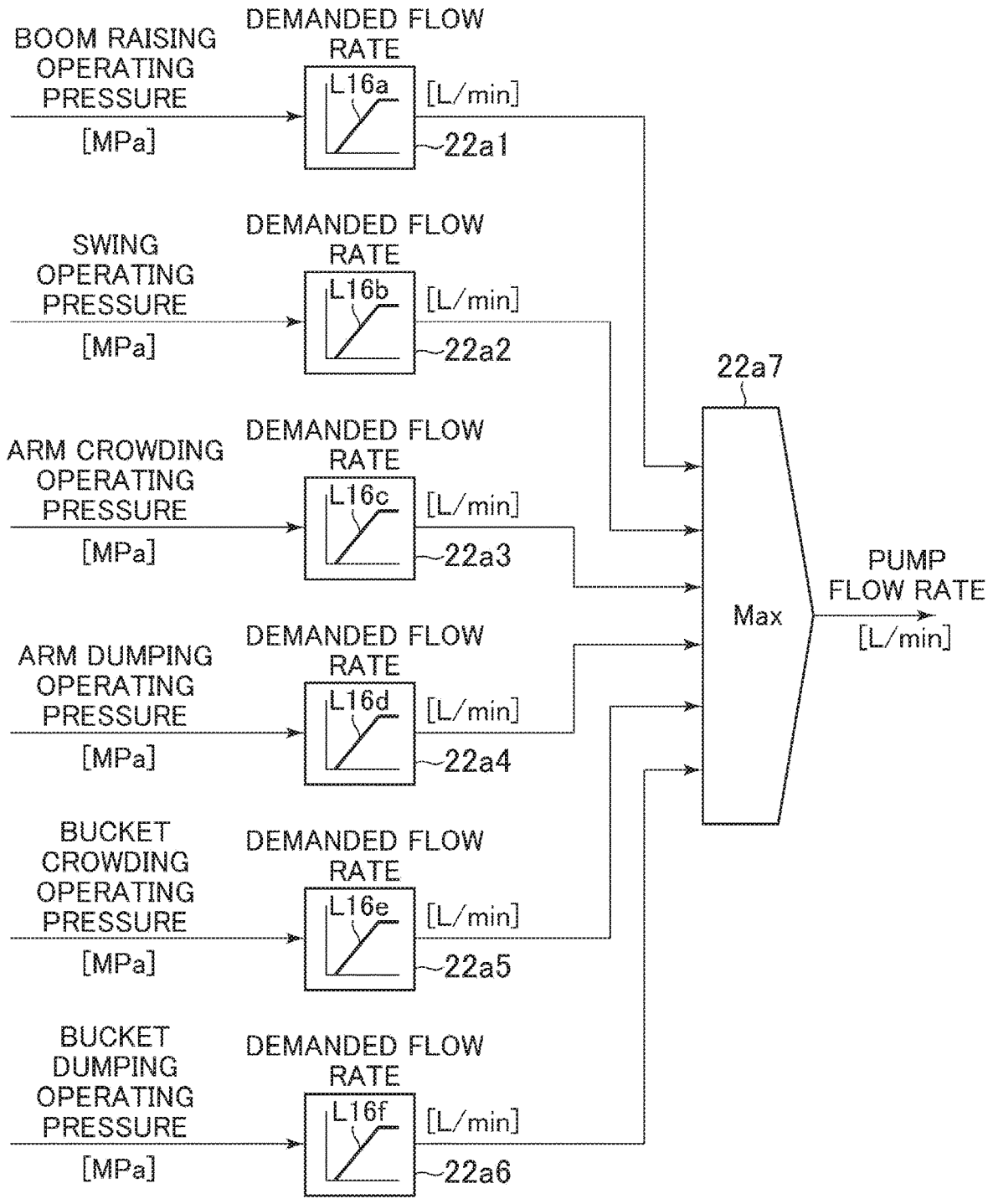
FIG. 18 shows details of a demanded flow rate computing section shown in FIG. 11.

FIG. 18 specifically shows part of the demanded flow rate computing section 22*a* shown in FIG. 11. The demanded flow rate computing section 22*a* has a boom raising demanded flow rate computing section 22*a*1, a swing demanded flow rate computing section 22*a*2, an arm crowding demanded flow rate computing section 22*a*3, an arm dumping demanded flow rate computing section 22*a*4, a bucket crowding demanded flow rate computing section 22*a*5, a bucket dumping demanded flow rate computing section 22*a*6, and a maximum value selection section 22*a*7. In FIG. 18, a left-and-right-travel-motors demanded flow rate computing section, a boom lowering demanded flow rate computing section, and a preparation (attachment) demanded flow rate computing section are not shown.

The boom raising demanded flow rate computing section 22*a*1 is a control table in which characteristics L16*a* of a pump demanded flow rate in response to the operating pressure for boom raising are set, and calculates a pump demanded flow rate corresponding to the operating pressure (operation signal) at the time from the operating pressure (operation signal). The characteristics L16*a* of the pump demanded flow rate are set such that the pump demanded flow rate becomes a maximum pump flow rate in a region in which the operating pressure is equal to or higher than a constant operating pressure.

The swing demanded flow rate computing section 22*a*2 is a control table in which characteristics L16*b* of a pump demanded flow rate in response to the operating pressure for swing are set, and calculates a pump demanded flow rate corresponding to the operating pressure (operation signal) at the time from the operating pressure (operation signal). The characteristics L16*b* of the pump demanded flow rate are set such that the pump demanded flow rate becomes a maximum pump flow rate in a region in which the operating pressure is equal to or higher than a constant operating pressure.

The arm crowding demanded flow rate computing section 22*a*3 is a control table in which characteristics L16*c* of a pump demanded flow rate in response to the operating pressure for arm crowding are set, and calculates a pump demanded flow rate corresponding to the operating pressure (operation signal) at the time from the operating pressure (operation signal). The characteristics L16*c* of the pump demanded flow rate are set such that the pump demanded flow rate becomes a maximum pump flow rate in a region in which the operating pressure is equal to or higher than a constant operating pressure.

The arm dumping demanded flow rate computing section 22*a*4 is a control table in which characteristics L16*d* of a pump demanded flow rate in response to the operating pressure for arm dumping are set, and calculates a pump demanded flow rate corresponding to the operating pressure (operation signal) at the time from the operating pressure (operation signal). The characteristics L16*d* of the pump demanded flow rate are set such that the pump demanded flow rate becomes a maximum pump flow rate in a region in which the operating pressure is equal to or higher than a constant operating pressure.

The bucket crowding demanded flow rate computing section 22*a*5 is a control table in which characteristics L16*e* of a pump demanded flow rate in response to the operating pressure for bucket crowding are set, and calculates a pump demanded flow rate corresponding to the operating pressure (operation signal) at the time from the operating pressure (operation signal). The characteristics L16*e* of the pump demanded flow rate are set such that the pump demanded flow rate becomes a maximum pump flow rate in a region in which the operating pressure is equal to or higher than a constant operating pressure.

The bucket dumping demanded flow rate computing section 22*a*6 is a control table in which characteristics L16*f* of a pump demanded flow rate in response to the operating pressure for bucket dumping are set, and calculates a pump demanded flow rate corresponding to the operating pressure (operation signal) at the time from the operating pressure (operation signal). The characteristics L16*f* of the pump demanded flow rate are set such that the pump demanded flow rate becomes a maximum pump flow rate in a region in which the operating pressure is equal to or higher than a constant operating pressure.

The characteristics L16*a* to L16*f* of the pump demanded flow rate are set such that only the necessary pump flow rate is output to correspond to the operation signal. Therefore, it is possible to exercise pump control non-wastefully with good fuel economy. These characteristics a to L16*f* of the pump demanded flow rate are set while it is assumed that the engine speed is the maximum engine speed.

The maximum value selection section 22*a*7 selects the maximum value of the pump demanded flow rates computed by the demanded flow rate computing sections 22*a*1 to 22*a*6 to compute the pump demanded flow rate. The selected pump demanded flow rate as the maximum value is given to the multiplication section 22*c* of FIG. 11.

Pump Horsepower Limiting Command Value Computing Section 23

Figure 12:
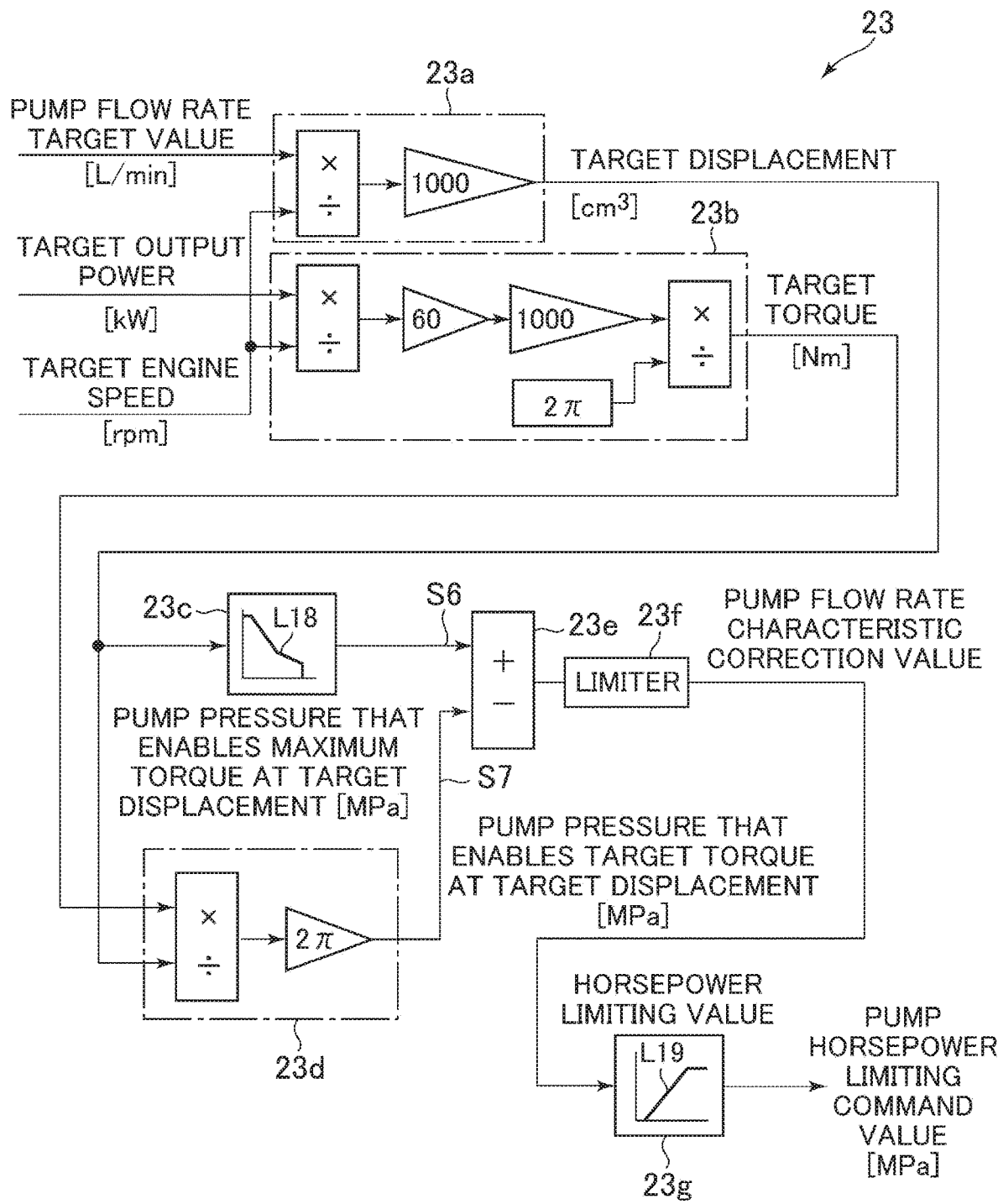
FIG. 12 shows contents of control by a pump horsepower limiting command value computing section according to the first embodiment of the present invention.

FIG. 12 shows contents of control by the pump horsepower limiting command value computing section 23 according to the first embodiment of the present invention.

In FIG. 12, the pump horsepower limiting command value computing section 23 has a target displacement computing section 23*a*, a target torque computing section 23*b*, a pump pressure computing section 23*c*, a pump pressure computing section 23*d*, a subtraction section 23*e*, a limiter 23*f*, and a horsepower limiting value computing section 23*g*.

The target displacement computing section 23*a* computes the pump target displacement by dividing the pump flow rate target value calculated by the pump flow rate limiting command value computing section 22 by the target engine speed, similarly to the target displacement computing section 22*f*.

The target torque computing section 23*b* calculates a pump target torque by dividing the pump target output power calculated by the pump target output power computing section 21 by the target engine speed.

The pump pressure computing section 23*c* is a control table in which characteristics L18 of a pump pressure that is responsive to the pump target displacement calculated by the target displacement computing section 23*a* and that enables a maximum torque at the target displacement are set, and calculates a pump pressure S6 that enables the maximum at the pump target displacement at the time from the pump target displacement. The characteristics L18 are set in accordance with the specifications of the hydraulic pump 9.

The pump pressure computing section 23*d* calculates a pump pressure S7 that enables the target torque at a present target displacement by dividing the pump target torque calculated by the target torque computing section 23*b* by the pump target displacement calculated by the target displacement computing section 23*a*.

The subtraction section 23e subtracts the pump pressure S7 from the pump pressure S6 to compute a pump flow rate characteristic correction value. This computation result (pump flow rate characteristic correction value) often becomes a negative value. Since only the flow rate characteristic correction value having a positive value is used as the characteristics of the hydraulic pump 9, the computation result is set to have a value equal to or higher than 0 by the limiter 23f. The pump flow rate characteristic correction value computed here corresponds to the pump flow rate characteristic correction value of FIG. 4.

The horsepower limiting value computing section 23g is a control table in which characteristics L19 of a pump horsepower limiting command value in response to the pump flow rate characteristic correction value are set, and computes a pump horsepower limiting command value corresponding to the pump flow rate characteristic correction value at the time from the pump flow rate characteristic correction value. The characteristics L19 are similarly set in accordance with the specifications of the hydraulic pump 9.

The controller 13 controls the pump horsepower control valve 52 by controlling the pump horsepower limiting solenoid valve 18a of the regulator 18 in such a manner that the pump horsepower limiting command value is obtained, and controls the absorption horsepower (pump horsepower) of the hydraulic pump 9.

Effects of Combined Use of Pump Flow Rate Limiting Command Value Computing Section 22 and Pump Horsepower Limiting Command Value Computing Section 23

Figure 13:
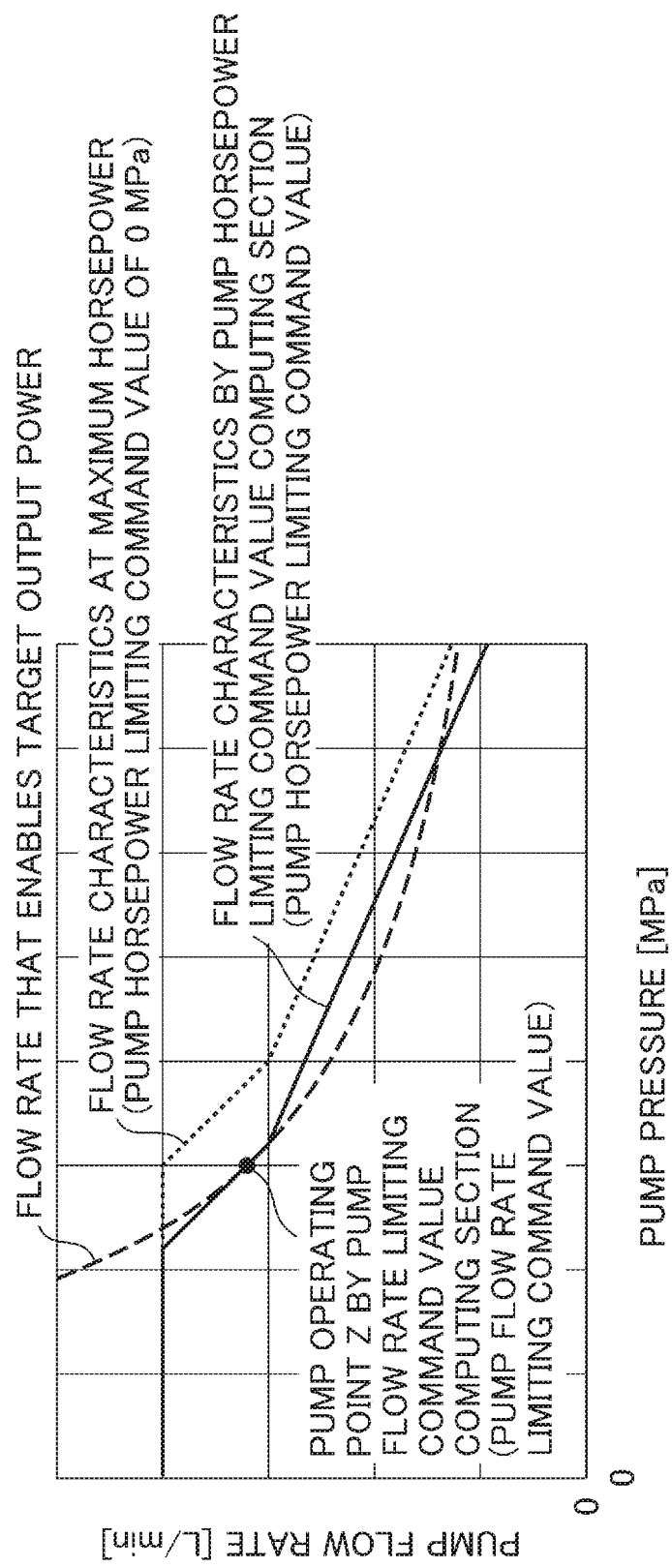
FIG. 13 is an explanatory diagram of effects produced by combined use of the pump flow rate limiting command value computing section and the pump horsepower limiting command value computing section.

FIG. 13 is an explanatory diagram of effects produced by combined use of the pump flow rate limiting command value computing section 22 and the pump horsepower limiting command value computing section 23.

If it is necessary to control only the output power (absorption horsepower) of the hydraulic pump, only pump flow rate control by the pump flow rate limiting command value computing section 22 can be used.

By the combined use of the pump flow rate limiting command value computing section 22 and the pump horsepower limiting command value computing section 23, the flow rate characteristics of the hydraulic pump 9 make a parallel translation by as much as the pump flow rate characteristic correction value, as shown in FIG. 4. When the pump flow rate characteristic correction value is determined as determined in computation by the pump horsepower limiting command value computing section 23, a pump operating point is denoted by, for example, Z of FIG. 13.

The flow rate characteristics of the hydraulic pump 9 are controlled in such a manner as to be tangent to the pump operating point Z by the pump flow rate limiting command value computing section (pump flow rate limiting command value) using the pump flow rate characteristic correction value computed by the pump horsepower limiting command value computing section 23. In other words, the pump horsepower control valve 52 is controlled such that the delivery flow rate of the hydraulic pump 9 limited by the pump horsepower control valve 52 matches the pump flow rate target value computed by the pump flow rate limiting command value computing section 22.

Generally, pump horsepower limiting is designed to increase or reduce a pump flow rate with high responsiveness to a pump pressure fluctuation. Owing to this, when a pump pressure fluctuates during operation such as time of starting an actuator, pump characteristics by pump horsepower limiting are set to be matched with the operating point Z by the pump flow rate control. It is thereby possible to stabilize the pump flow rate with high responsiveness to a sudden pump pressure fluctuation, cause the pressure fluctuation to converge more quickly, and suppress hunting and unnecessary powering assist of a generator motor.

Effects of First Embodiment

One typical work with the hydraulic excavator is excavation/loading work for excavating a ground and loading gravel and soil into a dump truck. An operating cycle of excavation, swing/boom raising, discharge of gravel and sand, return to swing, excavation, . . . is repeated in this work. When attention is paid to the excavation and the swing/boom raising, these operations are heavy load operations that require assist from the generator motor with electric power supplied from the electric storage device 12a. Furthermore, the swing/boom raising is normally higher than the excavation in demanded pump output power.

In Patent Document 1, when the remaining charge amount falls, the upper limiting value of the pump output power is limited irrespectively of the content of work. Owing to this, when output power after limitation is compared with that before limitation, the limiting (reduction) amount of the output power for the swing/boom raising is larger than that for the excavation. In other words, the ratio of the speed reduction during limitation to that during non-limitation for the swing/boom raising is higher than that for the excavation. This difference in speed reduction ratio possibly causes the operator engaged in a series of work to feel discomfort in operation and thereby feel an unnecessary stress.

The present embodiment solves the above problem as follows.

When the operator operates the operation lever of the arm operation device in the arm crowding direction and operates the operation lever of the bucket operation device in the bucket crowding direction for conducting excavation, the operating pressure for the arm crowding and the operating pressure for the bucket crowding are generated. In addition, the arm crowding demanded flow rate computing section 22a3 and the bucket crowding demanded flow rate computing section 22a5 shown in FIG. 18 compute the pump demanded flow rates corresponding to the respective operating pressures. The maximum value selection section 22a7 selects the maximum value, this maximum pump demanded flow rate is multiplied by the engine speed gain, and the demanded flow rate based on the operating pressure is computed.

On the other hand, when the state of charge of the electric storage device 12a is lower than the threshold (40%), the division section 21j shown in FIG. 9 computes the limiting ratio S4 in response to the degree of reduction of the state of charge of the electric storage device 12a. In addition, the multiplication section 21k multiplies the pump demanded power S3 computed by the pump demanded power computing section 21a and the multiplication section 21g by the limiting ratio S4, thereby computing the pump demanded power limited in response to the degree of reduction of the state of charge of the electric storage device 12a.

The target flow rate computing section 22d shown in FIG. 11 computes the pump flow rate corresponding to the limited pump demanded power. The minimum value selection section 22e selects the lower flow rate out of the pump flow rate and the demanded flow rate based on the operating pressure and computed by the multiplication section 22c as the pump flow rate target value, and the pump flow rate limiting value is computed. The pump flow rate limiting value is output as the solenoid valve current command value (mA) from the controller 13 to the pump flow rate limiting solenoid valve 18b, and the pump flow rate control pressure introduced to the pump flow control valve 53 of the regulator 18 is limited to the pump flow rate limiting value. The pump flow rate is thereby suppressed to be equal to or lower than the flow rate that enables the pump target output power while the hydraulic pump 9 delivers the necessary pump flow rate in response to the operating pressure. In addition, it is thereby possible to prevent the deterioration of the electric storage device 12a due to overdischarge of the electric storage device 12a and stalling of the engine 6 due to insufficient assist or disabled assist when the charge amount of the electric storage device 12a falls.

The same thing is true for a case in which the operator operates the operation lever of the boom operation device in the boom raising direction and operates the operation lever of the swing operation device for conducting swing/boom raising. The boom raising demanded flow rate computing section 22a1 and the swing demanded flow rate computing section 22a2 shown in FIG. 18 compute the pump demanded flow rates corresponding to the respective operating pressures. In addition, the maximum value selection section 22a7 selects the maximum value out of the pump demanded flow rates, this maximum pump demanded flow rate is multiplied by the engine speed gain, and the demanded flow rate based on the operating pressure is computed.

Furthermore, the target flow rate computing section 22d shown in FIG. 11 computes the pump flow rate corresponding to the pump demanded power computed by the pump target output power computing section 21. The minimum value selection section 22e selects the higher flow rate out of the pump flow rate and the demanded flow rate based on the operating pressure and computed by the multiplication section 22c as the pump flow rate target value, and the pump flow rate limiting value is computed. The pump flow rate limiting value is output as the solenoid valve current command value (mA) from the controller 13 to the pump flow rate limiting solenoid valve 18b, and the pump flow rate control pressure introduced to the pump flow control valve 53 of the regulator 18 is limited in such a manner that the pump flow rate control pressure does not exceed the pump flow rate limiting value. The pump flow rate is thereby suppressed to be equal to or lower than the flow rate that enables the pump target output power while the hydraulic pump 9 delivers the necessary pump flow rate in response to the operating pressure. In addition, it is thereby possible to prevent the deterioration of the electric storage device 12a due to overdischarge of the electric storage device 12a and stalling of the engine 6 due to insufficient assist or disabled assist when the charge amount of the electric storage device 12a falls.

Moreover, in the present embodiment, during excavation, the arm crowding demanded power computing section 21a3 and the bucket crowding demanded power computing section 21a4 of FIG. 17 compute the pump demanded power S20c (maximum: 60 kW) corresponding to the operating pressure for the arm crowding and the pump demanded power S20d (maximum: 40 kW) corresponding to the operating pressure for the bucket crowding, respectively. The minimum value selection section 21a7 selects the higher operating pressure out of the operating pressure for the arm crowding and the operating pressure for the bucket crowding as the operating pressure for excavation. The excavation demanded power computing section 21a8 calculates the pump demanded power S20f (maximum: 70 kW) corresponding to the operating pressure for the excavation. The maximum value selection section 21a9 selects the maximum pump demanded power among the pump demanded power S20c, S20d, and S20f as the pump demanded power S20.

The multiplication section 21g shown in FIG. 9 multiplies the pump demanded power S20 computed as described above by the engine speed gain at the time to compute the pump demanded power S3. The multiplication section 21k multiplies the pump demanded power S3 by the limiting ratio S4 in response to the degree of reduction of the state of charge of the electric storage device 12a, thereby computing the pump demanded power limited in response to the degree of reduction of the state of charge of the electric storage device 12a. This pump demanded power is transmitted to the target flow rate computing section 22d of the pump flow rate limiting command value computing section 22 shown in FIG. 11, and the target flow rate computing section 22d computes the pump flow rate corresponding to the pump demanded power. The minimum value selection section 22e imposes limiting such that the demanded flow rate based on the operating pressure and computed by the multiplication section 22c does not exceed the pump flow rate corresponding to the pump demanded power, thereby computing the pump flow rate limiting value. The pump flow rate limiting value is output as the solenoid valve current command value (mA) from the controller 13 to the pump flow rate limiting solenoid valve 18b, and the pump flow rate control pressure introduced to the pump flow control valve 53 of the regulator 18 is limited in such a manner that the pump flow rate control pressure does not exceed the pump flow rate limiting value, and the pump flow rate is controlled.

Furthermore, the same thing is true for a case of conducting swing/boom raising. The boom raising demanded power computing section 21a1 and the swing demanded power computing section 21a2 of FIG. 17 compute the pump demanded power S20a (maximum: 75 kW) corresponding to the operating pressure for the boom raising and the pump demanded power S20b (maximum: 60 kW) corresponding to the operating pressure for the swing, respectively. The minimum value selection section 21a5 selects the higher operating pressure out of the operating pressure for the boom raising and the operating pressure for the swing as the operating pressure for the swing/boom raising. The swing/boom raising demanded power computing section 21a6 calculates the pump demanded power S20e (maximum: 90 kW) corresponding to the operating pressure for the swing/boom raising. The maximum value selection section 21a9 selects the maximum pump demanded power among the pump demanded power S20a, S20b, and S20e as the pump demanded power S20. The minimum value selection section 22e of the pump flow rate limiting command value computing section 22 shown in FIG. 11 imposes limiting such that the demanded flow rate based on the operating pressure and computed by the multiplication section 22c does not exceed the pump flow rate corresponding to the pump demanded power, thereby computing the pump flow rate limiting value. The pump flow rate limiting value is output as the solenoid valve current command value (mA) from the controller 13 to the pump flow rate limiting solenoid valve 18b, and the pump flow rate control pressure introduced to the pump flow control valve 53 of the regulator 18 is limited in such a manner that the pump flow rate control pressure does not exceed the pump flow rate limiting value and the pump flow rate is controlled.

In this way, the present pump demanded power S3 is computed on the basis of the operating pressure that is the work related information for every operating pressure or every type of work, the pump flow rate limiting command value is computed on the basis of the pump target output power S5 obtained by limiting the pump demanded power S3 in response to the degree of reduction of the state of charge of the electric storage device 12a, and the delivery flow rate of the hydraulic pump 9 is controlled in such a manner that the output power of the hydraulic pump 9 does not exceed the pump target output power S5. As a result, during both the excavation and the boom raising/swing, the output power of the hydraulic pump 9 is limited in response to the operating pressure that is the work related information. It is, therefore, possible to reduce a speed while balance is kept as a whole in a series of continuous cycle work, minimize discomfort in operation when the speed falls, suppress the operator from feeling discomfort in operation, and ensure favorable operability.

In this way, according to the first embodiment of the present invention, when the state of charge of the electric storage device 12a is lower than the threshold (40%), then the present pump demanded power S3 is limited in response to the degree of reduction of the state of charge of the electric storage device 12a to compute the pump target output power, and the delivery flow rate of the hydraulic pump 9 is controlled. It is thereby possible to prevent deterioration of the electric storage device 12a due to overdischarge of the electric storage device 12a and stalling of the engine 6 due to insufficient assist or disabled assist, and continuously conduct work when the charge amount of the electric storage device 12a falls.

Furthermore, the present pump demanded power S3 is computed on the basis of the work related information (operating pressure that is the operation signal in the example of the drawings), the pump flow rate limiting command value is computed on the basis of the pump target output power S5 obtained by limiting the pump demanded power S3 in response to the degree of reduction of the state of charge of the electric storage device 12a, and the delivery flow rate of the hydraulic pump 9 is controlled in such a manner that the output power of the hydraulic pump 9 does not exceed the pump target output power S5. The output power of the hydraulic pump 9 is thereby limited in response to the work related information. It is, therefore, possible to reduce the speed while balance is kept as a whole in a series of continuous cycle work, minimize discomfort in operation when the speed falls, suppress the operator from feeling discomfort in operation, and ensure favorable operability.

Moreover, according to the first embodiment of the present invention, the pump horsepower limiting command value computing section 23 is provided in the controller 13. The pump horsepower limiting command value computing section 23 is configured to exercise control over the pump horsepower control valve 52 such that the delivery flow rate of the hydraulic pump 9 limited by the pump horsepower control valve 52 matches the pump flow rate target value computed by the pump flow rate limiting command value computing section 22. It is thereby possible to stabilize the pump flow rate with high responsiveness to a sudden pump pressure fluctuation, cause the pressure fluctuation to converge more quickly, and suppress hunting and unnecessary powering assist from the generator motor.

Second Embodiment

A second embodiment of the present invention will next be explained. The second embodiment is similar to the first embodiment in main configuration. Different parts from those of the first embodiment will be explained.

Pump Target Output Power Computing Section 21

The first embodiment and the second embodiment of the present invention differ in contents of processing of the pump target output power computing section 21.

Figure 14:
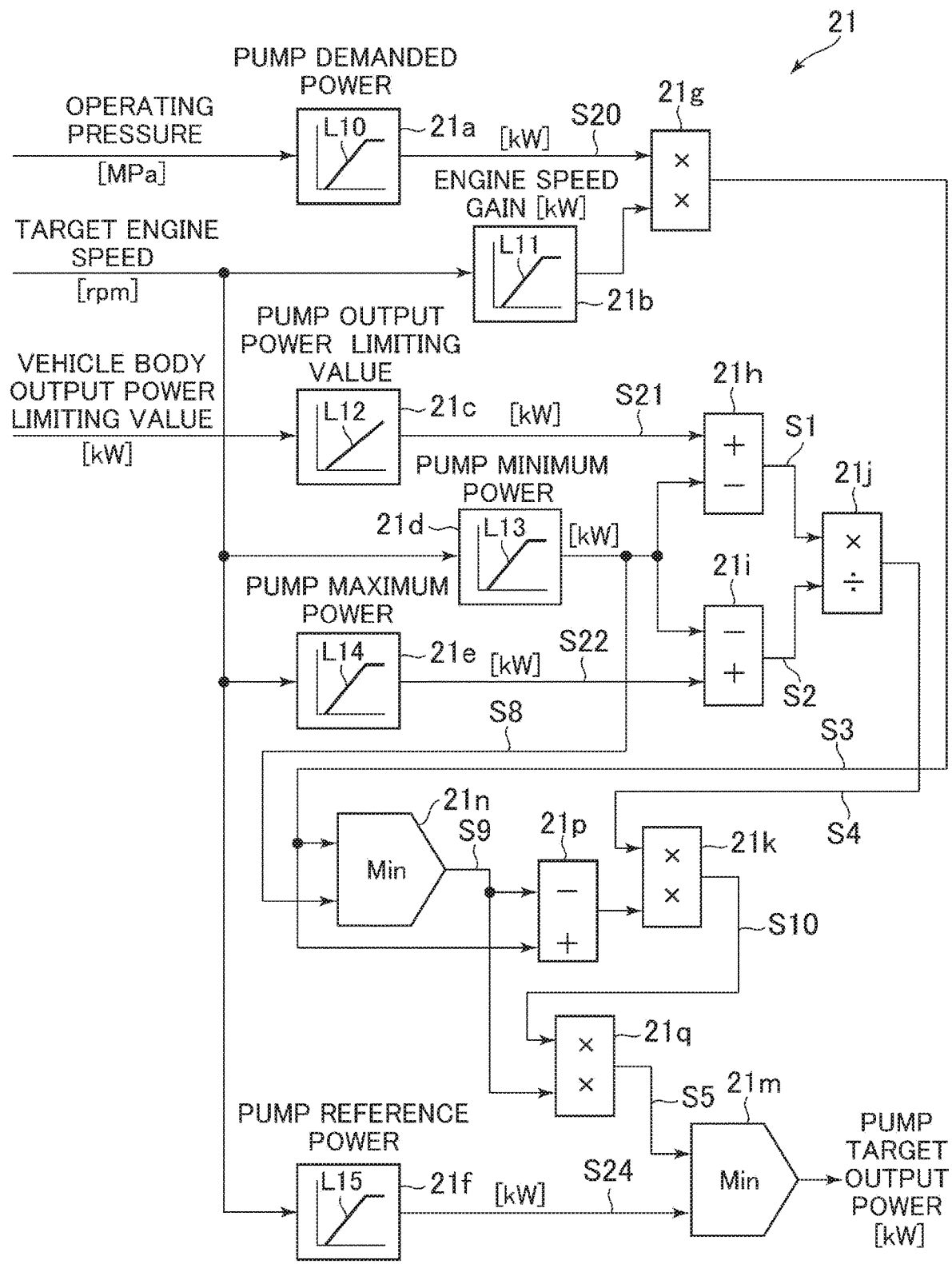
FIG. 14 shows contents of control by the pump target output power computing section according to a second embodiment of the present invention.

FIG. 14 shows contents of control by the pump target output power computing section 21 according to the second embodiment of the present invention.

In FIG. 14, the pump target output power computing section 21 has a minimum value selection section 21n, a subtraction section 21p, and an addition section 21q as well as the pump demanded power computing section 21a, the engine speed gain computing section 21b, the pump output power limiting value computing section 21c, the pump minimum power setting section 21d, the pump maximum power setting section 21e, the pump reference power computing section 21f, the multiplication section 21g, the subtraction section 21h, the subtraction section 21i, the division section 21j, the multiplication section 21k, and the minimum value selection section 21m shown in FIG. 9.

The minimum value selection section 21n selects a minimum value out of the before-limiting pump target output power S3 and the pump minimum power S8.

The subtraction section 21p calculates a difference S23 between a computation result S9 of the minimum value selection section 21n and the before-limiting pump target output power S3. The multiplication section 21k multiplies the difference S23 by the limiting ratio S4, thereby computing a limited output power amount S10 in response to the limiting ratio S4 for the pump target output power that exceeds the pump minimum power S8.

The addition section 21q adds the limited output power amount S10 to the computation result S9, thereby determining the after-limiting pump target output power S5 corresponding to the vehicle body output power limiting value.

In this way, the pump target output power computing section 21 sets the pump minimum power S8 as a pump output power limiting effective threshold. When the state of charge of the electric storage device 12a is lower than 40% that is the threshold, computation is performed in such a manner that an output power part equal to or higher than the pump output power limiting effective threshold S8 out of the pump target output power S3 is limited in response to the degree of reduction of the state of charge of the electric storage device 12a (limiting ratio S4), thereby limiting the pump target output power S3 and determining the pump target output power S5.

Figure 15:
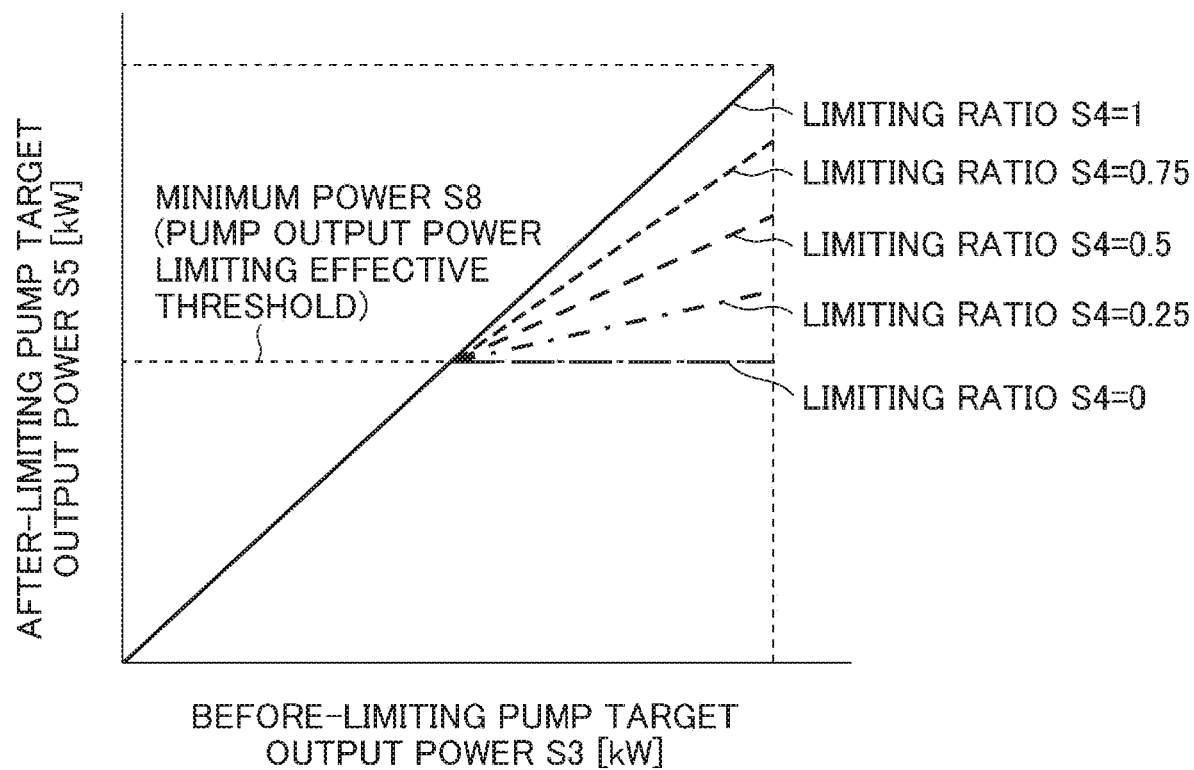
FIG. 15 shows limiting on pump target output power by the pump output power limiting ratio S4 based on the vehicle body output power allowable value while the horizontal axis represents the before-limiting pump target output power S3 and the vertical axis represents after-limiting pump target output power S5.

FIG. 15 shows limiting on pump target output power by the pump output power limiting ratio S4 based on the vehicle body output power limiting value while the horizontal axis represents the before-limiting pump target output power S3 and the vertical axis represents the after-limiting pump target output power S5.

When the before-limiting pump target output power S3 is lower than the pump minimum power S8 (pump output power limiting effective threshold), the minimum value selection result S9 is equal to the before-limiting pump target output power S3. Therefore, a difference between S9 and S3 is 0, and the after-limiting pump target output power S5 is equal to the before-limiting pump target output power S3 without limiting the pump target output power irrespective of the limiting ratio S4.

When the limiting ratio S4 is 1, the pump target output power is not limited; thus, the before-limiting pump target output power is equal to the after-limiting pump target output power. As the limiting ratio S4 is lower, the after-limiting pump target output power becomes lower. When the limiting ratio S4 is 0, the pump target output power is equal to the pump minimum power S18 set in L13.

The pump minimum power S8 is set to the value corresponding to the output power that can be driven solely by the engine with the powering assist from the generator motor regarded as 0. Therefore, when the pump target output power is limited to the minimum power, it is possible to cause the vehicle body to operate without reducing the charge rate of the electric storage device 12a and minimize deterioration of operator's operability.

The other parts are similar in configuration as those according to the first embodiment.

Effects of Second Embodiment

The second embodiment of the present invention configured as described above can attain similar effects to those of the first embodiment.

Furthermore, according to the second embodiment of the present invention, only the output power corresponding to the output power that can be driven solely by the engine and that requires the powering assist from the generator motor 8b is limited in response to the charge rate out of the pump target output power. Therefore, the output power is not limited in a low output power region in which speed reduction is not desired or speed reduction is unnecessary, so that it is possible to further suppress the deterioration of the operator's operability.

Furthermore, the pump target output power computing section 21 computes the pump output power limiting maximum value that is the pump maximum power corresponding to the normal state in which the state of charge of the electric storage device 12a is equal to or higher than the threshold (40%), and the pump output power limiting value that is the pump output power corresponding to the present state of charge of the electric storage device 12a. In addition, the pump target output power computing section 21 computes the present pump demanded power as the value irrespective of the state of charge of the electric storage device 12a. Further, the pump target output power computing section 21 computes the ratio of the difference between the pump output power limiting value S21 and the pump output power limiting effective threshold (pump minimum power S8) to the difference between the pump output power limiting maximum value (pump maximum power S22) and the pump output power limiting effective threshold (pump minimum power S8) as the limiting ratio S4 that denotes the degree of reduction of the state of charge of the electric storage device 12a, and computes the pump target output power by multiplying the difference between the present pump demanded power and the pump output power limiting effective threshold (pump minimum power S8) by the limiting ratio S4.

By doing so, a limiting amount on the present pump target output power can be determined by simple calculation that does not require complicated computation. By limiting the pump output power in accordance with the ratio of the reduction of a charging state of the electric storage device 12a, it is possible to reduce the speed while balance is kept as a whole irrespectively of operation, and minimize discomfort in operation when the speed falls.

Furthermore, the pump target output power computing section 21 computes the stationary output power of the hydraulic pump 9 that can be driven solely by the engine without the need of assist from the generator motor 8b as the pump output power limiting effective threshold, computes the pump maximum output power as the vehicle body obtained by the sum of the maximum output power of the engine 6 and the assist maximum output power of the generator motor 8b as the pump output power maximum value, and computes the pump maximum output power in the present state of charge of the electric storage device 12a as the pump output power limiting value.

By doing so, the output power limiting is not imposed on the pump target output power equal to or lower than the stationary output power of the hydraulic pump 9 that can be driven solely by the engine. Therefore, it is possible to minimize the output power limiting and minimize the deterioration of operator's operability.

Others

1. In the embodiments, the pump demanded power computing section 21a of the pump target output power computing section 2 and the demanded flow rate computing section 22a of the pump flow rate limiting command value computing section 22 use the operating pressure (operation signal) as the work related information for computing the pump demanded power or the pump demanded flow rate. As an alternative to the operating pressure or with the combined use with the operating pressure, information such as the delivery pressure of the hydraulic pump 9, the driving pressure of one of the hydraulic actuators 3, or setting information on the type of work may be used.

2. In the embodiments, the pump flow rate limiting solenoid valve 18b is configured such that the pump flow rate control pressure generated by the operating pressure control valve 17 is limited. Alternatively, the pump flow rate limiting solenoid valve 18b may be configured such that an original pressure of the pump flow rate limiting solenoid valve 18b is defined as the pilot pressure of the pilot pump 16 and the pump flow rate limiting pressure is generated on the basis of the pilot pressure. With the configuration of the pump flow rate limiting solenoid valve 18b such that the pump flow rate control pressure generated by the operating pressure control valve 17 is limited as in the present embodiment, if a failure occurs to the controller 13 or the pump flow rate limiting solenoid valve 18b, the pump flow rate control pressure generated by the operating pressure control valve 17 can control the delivery flow rate of the hydraulic pump 9 and work can be continuously conducted, that is, a fail-safe function can be implemented.

3. In the embodiments, the pump reference power computing section 21f and the minimum value selection section 21m are provided in the pump target output power computing section 21 to enable the controller 13 to have an electronic horsepower computing function. However, since the regulator 18 includes the pump horsepower control valve 52, the pump reference power computing section 21f and the minimum value selection section 21m may be omitted.

4. In the embodiments, the target flow rate computing section 22d of the pump flow rate limiting command value computing section 22 computes the pump flow rate that serves as the present pump target output power using the delivery pressure (pump pressure) of the hydraulic pump 9. As an alternative to the pump pressure, the actuator pressure that is the signal from one of the actuator pressure sensors 9b may be used. In this case, since the plurality of actuator pressure sensors 9b are present, the highest pressure among the actuator pressures may be selected and used.

5. While the output limiting in response to the reduction of the charge rate has been explained in the embodiments, it is widely known that the deterioration of the lithium-ion battery 12a is also accelerated by a status of use of the lithium-ion battery 12a. In other words, when a high current is input to and output from the lithium-ion battery 12a in short time even within a maximum current value, the deterioration is accelerated. Therefore, if there is previous knowledge as to how much current input and output to/from a lithium-ion battery accelerates the deterioration in how many minutes, using the lithium-ion battery 12a without exceeding the value makes it possible to prevent the deterioration. At this time, when the pump target output power is limited in response to the status of use of the lithium-ion battery 12a as well as the reduction of the charge rate, it is possible to suppress the operator from feeling discomfort in operation as much as possible while preventing the deterioration.

6. Moreover, while the embodiments have been explained with use of the lithium-ion battery 12a taken by way of example, the electric storage device 12a of the present invention is not limited to the lithium-ion battery. A secondary battery (for example, a nickel-cadmium battery or a nickel-hydrogen battery) or a capacitor having a capacity capable of supplying necessary electric power may be adopted as the electric storage device 12a. Furthermore, a booster device such as a DC-DC converter may be installed between this electric storage device 12a and the direct-current bus.

DESCRIPTION OF REFERENCE CHARACTERS

100: Lower travel structure
200: Upper swing structure
300: Front work implement
3a: Boom
3b: Arm
3c: Bucket
3d: Boom cylinder
3e: Arm cylinder
3f: Bucket cylinder
3g: Swing hydraulic motor
3h: Travel hydraulic motor
4a: Operation room
5: Display device
6: Engine
7: Engine control unit (ECU)
8a: First inverter
8b: Generator motor
9: Hydraulic pump
9a: Pump pressure sensor
10: Control valve
10a: Actuator pressure sensor
11a: Second inverter
11b: Swing electric motor
12a: Electric storage device 12a (lithium-ion battery)
12b: Battery control unit (BCU) (charge control system)
13: Machine controller
14: Engine control dial (EC dial)
15: Operation device
15a: Operation lever
15b: Operating pressure sensor
16: Pilot pump
17: Operating pressure control valve
18: Regulator
18a: Pump horsepower limiting solenoid valve
18b: Pump flow rate limiting solenoid valve
19: Pump control system
20: Vehicle body output power limiting value computing section
21: Pump target output power computing section
22: Pump flow rate limiting command value computing section
23: Pump horsepower limiting command value computing section
51: Pump actuator
52: Pump horsepower control valve
53: Pump flow control valve

The invention claimed is:
1. A hybrid construction machine, comprising:
an engine;
at least one generator motor;
an electric storage device that is charged when the at least one generator motor is caused to perform a power generation operation and that is discharged when the at least one generator motor is caused to perform a powering operation;
an electric storage control system that computes a state of charge of the electric storage device and monitors the electric storage device;
a variable displacement hydraulic pump driven by torques of the engine and the at least one generator motor;
a plurality of hydraulic actuators driven by a hydraulic fluid delivered from the hydraulic pump;
a plurality of operation devices that output operation signals in response to operation amounts for the plurality of hydraulic actuators and instruct the hydraulic actuators to operate;
a controller that controls charge of electric power and discharge of electric power of the at least one generator motor and a delivery flow rate and output power of the hydraulic pump; and
a regulator that controls a displacement of the hydraulic pump to control the delivery flow rate of the hydraulic pump,
wherein the controller is configured to:
compute present pump demanded power of the hydraulic pump on the basis of work related information,
limit the present pump demanded power in response to a degree of reduction of a state of charge of the electric storage device acquired from the electric storage control system when the state of charge of the electric storage device is lower than a preset first threshold, and compute the limited present pump demanded power as the present pump target output power, and
compute the pump flow rate limiting command value on the basis of the present pump target output power in such a manner that the output power of the hydraulic pump does not exceed the pump target output power,
wherein the regulator controls the displacement of the hydraulic pump and controls the delivery flow rate of the hydraulic pump on the basis of the pump flow rate limiting command value, and
wherein the controller is further configured to:
set pump minimum power that is lower limit pump output power for limiting pump demanded power in response to the state of charge of the electric storage device, as a pump output power limiting effective threshold that is a second threshold,
compute a pump output power limiting maximum value that is pump maximum power corresponding to a normal state in which the state of charge of the electric storage device is equal to or higher than the first threshold, and a pump output power limiting value that is pump output power corresponding to a present state of charge of the electric storage device, compute the present pump demanded power as a value independent of the state of charge of the electric storage device, compute a ratio of a difference between the pump output power limiting value and the second threshold, a difference between the pump output power limiting maximum value, and the second threshold as a limiting ratio that represents the degree of reduction of the state of charge of the electric storage device, and compute the pump target output power by multiplying a difference between the present pump demanded power and the second threshold by the limiting ratio when the present pump demanded power is equal to or higher than the second threshold, thereby to limit the pump target output power by performing computation in such a manner that an output power part equal to or higher than the second threshold out of the pump target output power is limited in response to the degree of reduction of the state of charge of the electric storage device when the state of charge of the electric storage device is lower than the first threshold.

2. The hybrid construction machine according to claim 1, wherein the controller is further configured to:

compute stationary output power of the hydraulic pump that can be driven solely by the engine without need of assist from the at least one generator motor, as the second threshold, compute pump maximum output power as a vehicle body obtained by a sum of maximum output power of the engine and assist maximum output power of the at least one generator motor, as the pump output power limiting maximum value, and compute pump maximum output power in the present state of charge of the electric storage device, as the pump output power limiting value.

3. The hybrid construction machine according to claim 1, wherein the controller is further configured to:

compute a vehicle body output power limiting value allowable by a vehicle body on the basis of maximum output power of the engine at a present engine speed and maximum output power of the at least one generator motor in the present state of charge of the electric storage device, and compute the pump output power limiting value on the basis of the vehicle body output power limiting value.

4. The hybrid construction machine according to claim 1, further comprising:

a plurality of operation signal sensors that detect the operation signals of the plurality of operation devices, wherein the work related information comprises the plurality of operation signals detected by the plurality of operation signal sensors, the controller includes a plurality of control tables in which characteristics of a plurality of pump demanded power in response to the respective plurality of operation signals are set, the characteristics having optimum maximum demanded power in response to types of driving and work of hydraulic actuators corresponding to the plurality of operation signals, and the controller is configured to compute the present pump demanded power on the basis of the plurality of operation signals using the plurality of control tables.

5. The hybrid construction machine according to claim 1, further comprising:

a plurality of operation signal sensors that detect the operation signals of the plurality of operation devices, wherein the regulator includes:

a pump horsepower control valve to which a delivery pressure of the hydraulic pump is introduced, and that limits the delivery flow rate of the hydraulic pump in such a manner that absorption horsepower of the hydraulic pump does not exceed reference maximum horsepower; and a pump flow control valve that controls the delivery flow rate of the hydraulic pump on the basis of the pump flow rate limiting command value computed by the controller, wherein the controller is further configured to:

compute a pump flow rate target value on the basis of the plurality of operation signals and the pump target output power, compute the pump flow rate limiting command value by converting the pump flow rate target value into a target displacement of the hydraulic pump, and compute a pump horsepower limiting command value for controlling the pump horsepower control valve in such a manner that the delivery flow rate of the hydraulic pump limited by the pump horsepower control valve matches the pump flow rate target value.

6. The hybrid construction machine according to claim 1, wherein the controller is further configured to:

compute a vehicle body output power limiting value computing section that computes a vehicle body output power limiting value allowable by a vehicle body on the basis of maximum output power of the engine at a present engine speed and maximum output power of the at least one generator motor in a present state of charge of the electric storage device, and compute a pump output power limiting value that is pump output power corresponding to the present state of charge of the electric storage device on the basis of the vehicle body output power limiting value, perform computation in such a manner that the present pump demanded power is limited in response to the degree of reduction of the state of charge of the electric storage device on the basis of the pump output power limiting value, and compute the present pump target output power.

\* \* \* \* \*